US006748421B1

(12) United States Patent
Ozkan et al.

(10) Patent No.: US 6,748,421 B1
(45) Date of Patent: Jun. 8, 2004

(54) METHOD AND SYSTEM FOR CONVEYING VIDEO MESSAGES

(75) Inventors: Nadine Ozkan, New South Wales (AU); Cecile Paris, New South Wales (AU); Maria Milosavljevic, New South Wales (AU); Sue-Ken Yap, New South Wales (AU); William Simpson-Young, New South Wales (AU); Charles Chung, New South Wales (AU); John Charles Brook, Stanhope Garden (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/468,866

(22) Filed: Dec. 21, 1999

(30) Foreign Application Priority Data

| Dec. 23, 1998 | (AU) | PP7889 |
| Dec. 23, 1998 | (AU) | PP7890 |
| Dec. 23, 1998 | (AU) | PP7891 |
| Dec. 23, 1998 | (AU) | PP7892 |
| Dec. 23, 1998 | (AU) | PP7893 |
| Dec. 23, 1998 | (AU) | PP7895 |

(51) Int. Cl.[7] ............ G06F 15/16; G06F 3/00; G06F 13/00; H04N 5/445; H04N 7/18; G09G 5/00

(52) U.S. Cl. .......... 709/206; 709/709; 709/202; 709/208; 709/219; 709/231; 725/41; 725/47; 725/87; 345/716; 345/724; 345/854

(58) Field of Search ............... 709/202, 206, 709/208, 213, 217, 219, 220, 231; 725/37, 41, 47, 87; 345/716, 724, 769, 854; 715/500.1, 515, 908; 358/402, 403

(56) References Cited

U.S. PATENT DOCUMENTS

| 5,761,417 | A | * | 6/1998 | Henley et al. | 709/231 |
| 5,987,509 | A | * | 11/1999 | Portuesi | 725/113 |
| 6,064,379 | A | * | 5/2000 | DeMoney | 715/500.1 |
| 6,119,154 | A | * | 9/2000 | Weaver et al. | 709/219 |
| 6,138,147 | A | * | 10/2000 | Weaver et al. | 709/206 |
| 6,160,907 | A | * | 12/2000 | Robotham et al. | 382/154 |
| 6,173,317 | B1 | * | 1/2001 | Chaddha et al. | 709/219 |
| 6,204,840 | B1 | * | 3/2001 | Petelycky et al. | 715/500.1 |
| 6,225,993 | B1 | * | 5/2001 | Lindblad et al. | 345/716 |
| 6,268,856 | B1 | * | 7/2001 | Bruck et al. | 345/733 |
| 6,295,058 | B1 | * | 9/2001 | Hsu et al. | 345/769 |
| 6,314,454 | B1 | * | 11/2001 | Wang et al. | 709/206 |
| 6,320,600 | B1 | * | 11/2001 | Smith et al. | 345/723 |

OTHER PUBLICATIONS

Assorted VideoGuys web pages, including main page, RT–4 Real–Time NLE Round Up, and Sonic ReelDVD 3.0 pages, www.videoguys.com.*

Kamba, Tomonari, et al. "The Krakatoa Chronicle—An Interactive, Personalized, Newspaper on the Web," 1995.*

"MHEGAM–A Multimedia Messaging System" (Kervella et al) (Oct.–Dec. 1997 from IEEE Multimedia, pp. 22–29.

(List continued on next page.)

*Primary Examiner*—Robert B. Harrell
*Assistant Examiner*—M H P
(74) *Attorney, Agent, or Firm*—Fitzpatrick, Cella, Harper & Scinto

(57) ABSTRACT

A method and system (100) for conveying a video message is disclosed. Video data comprising at least image data and associated audio data is captured and a video message structure (401) is created. A link is established between the structure (401) and the video data to create a structured video message. The structured video message is characterized by a video message structure (401) that provides an originator (103), of the message, enhanced manipulation capabilities for the video data by manipulating the structure (401). The structured video message can be conveyed to a recipient for viewing and/or for providing the recipient substantially the same enhanced manipulation capabilities.

136 Claims, 26 Drawing Sheets

OTHER PUBLICATIONS

"Integrated Multimedia E–mail Handler with Authoring Tool" (Lee et al) Apr. 28–May 2, 1997 from High Performance Computing on the Information Superhighway, HPC–Asia '97.

"Development of Multimedia E–mail System Providing an Integrated Message View" (Dokko et al) HPC–Asia '97 Apr. 28–May 2, 1997.

* cited by examiner

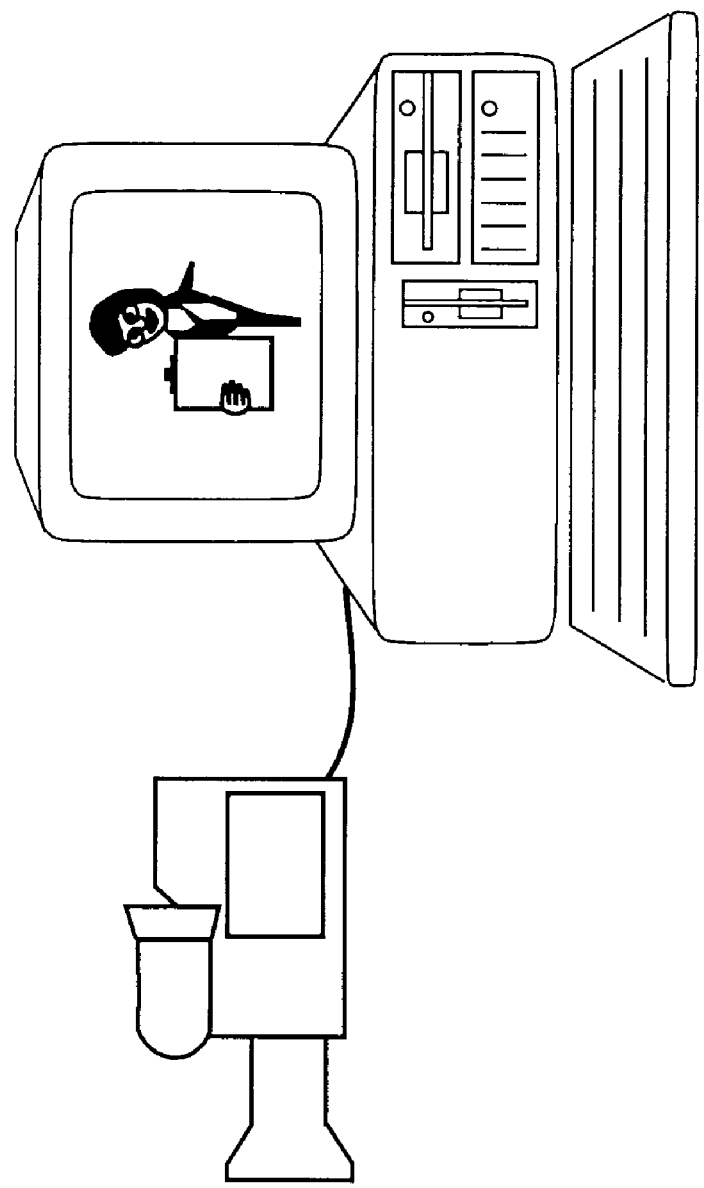
Fig. 14

METHOD AND SYSTEM FOR CONVEYING VIDEO MESSAGES

FIELD OF INVENTION

The present invention relates to asynchronous video messaging, and in particular, to a method and system for conveying video messages. The invention also relates to a computer program product including a computer readable medium having recorded thereon a computer program for conveying video messages.

BACKGROUND OF INVENTION

There is currently a boom in the use of asynchronous messaging technologies including email and voice-mail. An exceptional volume of messages sent and received by corporate and government workers have meant changes in the way in which people structure their day and has put an emphasis on managing information flow. The high level of messaging is attributed in part to the current difficulty in scheduling synchronous communication (face-to-face, telephone, videoconference, etc). Synchronous communication is considered a luxury put aside for relationship building and immediate closure whereas asynchronous communication is used for most other communication.

Video messaging refers to asynchronous video communication, that is, there is a delay between the generation of a message and its delivery, and typically, communication is not simultaneously bi-directional, as opposed to the synchronous communication of person-to-person telephone calls or video conferencing.

Currently, video email products such as "SeeMail" by RealMedia Inc. or "VideoLink Mail" by Smith Micro Software Inc are good examples of the state of the art video messaging technology and are largely simple packages which are distributed with video capture cards or sold separately and support the basic capture and sending of a video message as an email attachment or as the main body of an email. These packages, however, do not take advantage of the unique qualities of this kind of message to provide support for effective communication, but instead, rely on the conventional capture and usage model of linear video. Even where video and/or audio editing capabilities may be provided, it is typical that the sender, if wishing to review a message, or a recipient, must conform to the constraints of the conventional linear playing method for video messages.

Video is a time-based medium and typically requires time equal to its duration to view fully, although there are some video/audio fast-play technologies available which provide a particular solution to the dilemma of enforced linear replay of video/audio material, but these amount to fast cuing or fast forwarding of the linear video message. Conventional video is a difficult medium to navigate through and manipulate. For example, one possible use for video messages is for a sender to send a weekly report to one or more recipients. Such a weekly report can contain, scattered through its content, a set of actions for the various recipients of the message. A recipient might view the whole message once initially, and need to subsequently access parts of the message when ready to perform the actions requested. Doing this with a conventional video cassette recorder-style (VCR-style) interface is very inefficient and in most practical situations time consuming.

It is, therefore, an object of the present invention to ameliorate one or more disadvantages of the prior art.

SUMMARY OF THE INVENTION

According to a first aspect of the invention there is provided a method of conveying a video message comprising the steps of:

(i) capturing video data comprising at least image data and associated audio data;

(ii) creating a video message structure;

(iii) establishing a link between said structure and the video data to create a structured video message, said structured video message being characterized by a video message structure that provides an originator, of the message, enhanced manipulation capabilities for the video data by manipulating said structure; and (iv) conveying the structured video message to a recipient for viewing and/or for providing said recipient substantially the same enhanced manipulation capabilities.

According to a second aspect of the invention there is provided an apparatus for conveying a video message, said apparatus comprising:

capturing means for capturing video data comprising at least image data and associated audio data;

processing means for creating a video message structure and establishing a link between said structure and the video data to create a structured video message, said structured video message being characterized by a video message structure that provides an originator, of the message, enhanced manipulation capabilities for the video data by manipulating said structure; and means for conveying the structured video message to a recipient for viewing and/or for providing said recipient substantially the same enhanced manipulation capabilities.

According to a third aspect of the invention there is provided a computer readable memory medium for storing a program for apparatus which processes data, said processing comprising a method of conveying a video message, said program comprising:

code for capturing video data comprising at least image data and associated audio data;

code for creating a video message structure;

code for establishing a link between said structure and the video data to create a structured video message, said structured video message being characterized by a video message structure that provides an originator, of the message, enhanced manipulation capabilities for the video data by manipulating said structure; and code for conveying the structured video message to a recipient for viewing and/or for providing said recipient substantially the same enhanced manipulation capabilities.

According to a fourth aspect of the invention there is provided a method of creating a video message comprising the steps of;

providing a video message structure including at least one node;

providing video data, said video data comprising at least image data and associated audio data;

associating at least one node of the video message structure with at least one segment of the video data to provide an associated structure; and utilizing the associated structure to provide enhanced manipulation capabilities of the video data to create a structured video message.

According to a fifth aspect of the invention there is provided a method of creating a video message comprising the steps of;

creating a video message structure including at least one node;

capturing video data, said video data comprising at least image data and audio data;

linking at least one node of the video message structure with at least one segment of the video data to provide an associated structure;

storing the video data and the video message structure; and utilizing the associated structure to provide enhanced manipulation capabilities of the video data to create a structured video message.

According to a sixth aspect of the invention there is provided an apparatus for creating a video message comprising;

means for creating a video message structure including at least one node;

means for capturing video data, said video data comprising at least image data and audio data;

means for linking at least one node of the video message structure with at least one segment of the video data to provide an associated structure;

means for storing the video data and the video message structure; and means for utilizing the associated structure to provide enhanced manipulation capabilities of the video data to create a structured video message.

According to a seventh aspect of the invention there is provided an apparatus for creating a video message comprising;

a video camera and capture manager for capturing video data, said video data comprising at least image data and audio data;

a message structure editor for creating a video message structure and for associating the video message structure with at least one segment of the video data to provide an associated structure;

a storage device for storing said video data and the video message structure; and manipulation means for using the associated structure to provide enhanced manipulation capabilities of the video data to create a structured video message.

According to an eighth aspect of the invention there is provided a computer readable memory medium storing a program for apparatus which processes data, said processing comprising a method of creating a video message, said program comprising:

code for creating a video message structure including at least one node;

code for capturing video data, said video data comprising at least image data and audio data;

code for linking at least one node of the video message structure with at least one segment of the video data to provide an associated structure;

code for storing the video data and the video message structure; and code for utilizing the associated structure to provided enhanced manipulation capabilities of the video data to create a structured video message.

According to a ninth aspect of the invention there is provided a method of conveying a video message comprising the steps of:

providing video data comprising at least image data and associated audio data;

providing a video message structure;

establishing a link between said structure and the video data to provide a structured video message, said structured video message being characterized by a video message structure that provides an originator, of the message, enhanced manipulation capabilities for the video data by manipulating said structure; and conveying the structured video message to a recipient for viewing and/or for providing said recipient substantially the same enhanced manipulation capabilities.

According to a tenth aspect of the invention there is provided a method of conveying a video message over a network, wherein said video message includes at least a video image and an associated audio message, said method including the steps of:

capturing said video message on a first apparatus;

processing said captured video message to provide a structured video message, wherein said structured video message is represented as a structure to allow originator labelling, navigation, editing and annotation capabilities;

transmitting over said network the structured video message to at least one second apparatus;

receiving said structured video message at the at least one second apparatus; and processing and viewing said received structured video message by a recipient in accordance with said structure.

According to a eleventh aspect of the invention there is provided a system for conveying a video message, wherein said video message includes at least a video image and an associated audio message, said system including:

at least one first apparatus including:

capturing means for capturing said video message;

processing means for processing the captured video message to provide a structured video message, wherein said structured video message is represented as a structure that allows originator labelling, navigation, editing and annotation capabilities; and means for transmitting the structured video message to at least one second apparatus, said second apparatus including:

means for receiving said structured video message; and means for processing and viewing by a recipient said received structured video message in accordance with said structure.

According to a twelfth aspect of the invention there is provided a computer readable medium for storing a program for apparatus which processes data, said processing comprising a method of conveying a video message over a network, wherein said video message includes at least a video image and an associated audio message, said program comprising:

code for capturing said video message on a first apparatus;

means for processing said captured video message to provide a structured video message, wherein said structured video message is represented as a structure to allow originator labelling, navigation, editing and annotation capabilities; and code for transmitting the structured video message to at least one second apparatus;

code for receiving said structured video message at the at least one second apparatus;

code for processing and viewing, by a recipient, said received structured video message in accordance with said structure.

According to a thirteenth aspect of the invention there is provided a method of creating a structured video message comprising the steps of:

providing a video message structure; and capturing video data in accordance with said video message structure to produce a structured video message.

According to a fourteenth aspect of the invention there is provided an apparatus for creating a structured video message comprising:

means for providing a video message structure; and means for capturing video data in accordance with said video message structure to produce a structured video message.

According to a fifteenth aspect of the invention there is provided an apparatus for capturing a video message comprising:

a video camera unit for capturing video data;

a capture manager responsive to capture commands for controlling the video camera unit and receiving the captured video data;

a user input interface for generating user commands; and a message structure editor responsive to said user commands for providing a video message structure, generating said capture commands and for associating the video message structure with at least one segment of the captured video data to provide a structured video message.

According to a sixteenth aspect of the invention there is provided a computer readable medium for storing a program for apparatus which processes data, said processing comprising a method of creating a structured video message, said program comprising:

code which is responsive to capture commands for capturing video data;

code for generating user commands; and code which is responsive to said user commands for providing a video message structure, generating said capture commands and for associating the video message structure with at least one segment of the captured video data to provide a structured video message.

According to a seventeenth aspect of the invention there is provided a method of editing a video message wherein said video message is represented as a video message structure including a plurality of nodes, said method including the steps of:

storing said video message in a memory;

displaying said video message structure; and manipulating said nodes to place said video message in a desired format, wherein at least one node represents a segment of said video message.

According to a eighteenth aspect of the invention there is provided an apparatus for editing a video message wherein said video message is represented as a video message structure including a plurality of nodes, said apparatus including:

means for storing said video message in a memory;

means for displaying said video message structure; and means for manipulating said nodes to place said video message in a desired format, wherein at least one node represents a segment of said video message.

According to a nineteenth aspect of the invention there is provided a computer readable medium for storing a program for apparatus which processes data, said processing comprising a method of editing a video message wherein said video message is represented as a video message structure including a plurality of nodes, said program comprising:

code for storing said video message in a memory;

code for displaying said video message structure; and code for manipulating said nodes to place said video message in a desired format, wherein at least one node represents a segment of said video message.

According to a twentieth aspect of the invention there is provided a method of generating a video message structure for a video message, said video message including video data comprising image data and associated audio data, the method including the steps of:

providing a message template; and executing said message template to generate a video message structure having a plurality of nodes, each said node being capable of representing a segment of video data of said video message.

According to a twenty-first aspect of the invention there is provided an apparatus for generating a video message structure for a video message, said video message including video data comprising image data and associated audio data, the apparatus comprising:

means for providing a message template; and means for executing said message template to generate a video message structure having a plurality of nodes, each said node being capable of representing a segment of video data of said video message.

According to a twenty-second aspect of the invention there is provided a computer readable medium for storing a program for apparatus which processes data, said processing comprising a method of generating a video message structure for a video message, said video message including video data comprising image data and associated audio data, said program comprising:

code for providing a message template; and code for executing said message template to generate a video message structure having a plurality of nodes, each said node being capable of representing a segment of video data of said video message.

According to a twenty-third aspect of the invention there is provided a method of conveying a video message including the steps of:

capturing video data on a first apparatus, wherein said video data includes at least image data and associated audio data;

processing said captured video data to provide a video message, wherein said video message includes said captured video data and a first video message structure being a first instantiation of a message template;

transmitting said video data and said message template to at least one second apparatus;

receiving the video data and the message template at the second apparatus;

processing said video data to provide a corresponding video message, wherein said corresponding video message includes said video data and a second video message structure being a second instantiation of said message template; and viewing said corresponding video message.

According to a twenty-fourth aspect of the invention there is provided a system for conveying a video message including:

at least one first apparatus including:

capturing means for capturing video, wherein said video data includes at least image data and associated audio data;

processing means for processing said captured video data to provide a video message, wherein said video message includes said captured video data and a first video message structure, said first structure being a first instantiation of a message template;

means for transmitting the structured video message to at least one second apparatus, said second apparatus including:

means for receiving the video data and the message template at the second apparatus;

means for processing said video data to provide a corresponding video message, wherein said corresponding video message includes said video data and a second video message structure being a second instantiation of said message template; and means for viewing said corresponding video message.

According to a twenty-fifth aspect of the invention there is provided a computer readable medium for storing a program for apparatus which processes data, said processing comprising a method of conveying a video message, said video message including video data comprising image data and associated audio data, said program comprising:

code for capturing video data on a first apparatus, wherein said video data includes at least image data and associated audio data;

code for processing said captured video data to provide a video message, wherein said video message includes said captured video data and a first video message structure being a first instantiation of a message template;

code for transmitting said video data and said message template to at least one second apparatus;

code for receiving the video data and the message template at the second apparatus;

code for processing said video data to provide a corresponding video message, wherein said corresponding video message includes said video data and a second video message structure being a second instantiation of said message template; and code for viewing said corresponding video message.

BRIEF DESCRIPTION OF THE DRAWINGS

Embodiments of the invention are described with reference to the drawings, in which:

FIG. 14 is a drawing showing a station in accordance with a fourth embodiment of the present invention;

DETAILED DESCRIPTION

Introduction

Figure 1A:
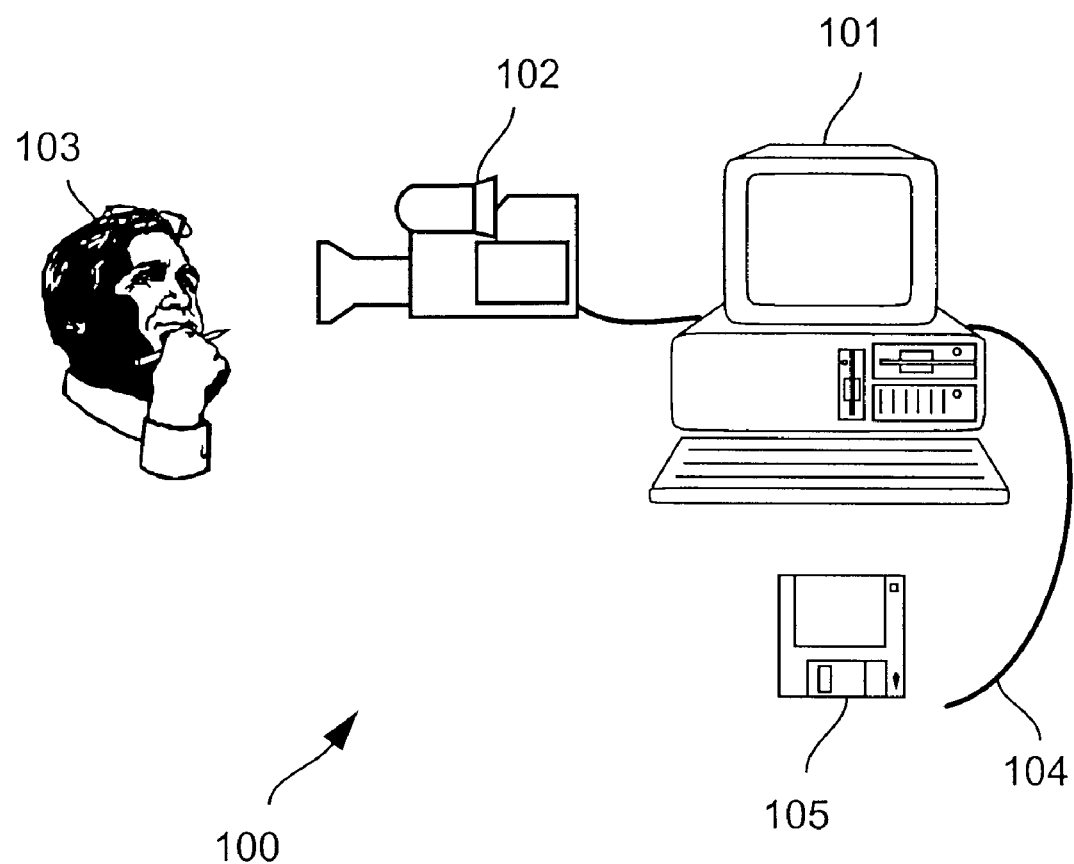
FIG. 1A is a drawing showing a sending station in accordance with the first embodiment of the present invention.

Where reference is made in any one or more of the drawings to steps and/or features, which have the same reference numerals, those steps and/or features are for the purposes of the description the same, unless otherwise indicated.

The video messaging system may be embodied in several alternatives or combinations involving some variations in functionality and application. Several of such alternative embodiments are preferentially described herein.

A video message as used herein is defined as typically including a video component and an optional audio component. Within the scope of the preferred embodiments, but without restriction, it would be typically expected that video and audio components of a video message would be captured simultaneously and with relative synchronism (or lip-sync) and also manipulated, transmitted, relayed, received, presented or replayed similarly in a relatively synchronous manner or in such a way as to preserve or recreate the original relative synchronism.

A video message, typically comprising a video and a relatively-synchronous audio component, but may also include other components as relevant to a particular embodiment or as an extension to any of the embodiments hereinafter described. Examples of additional or extension components are hyperlinks or Uniform Resource Locators (URLs) referencing other streams, media or documents, included streams, media or documents of any kind, or insertions or dubs within the audio or video components or both. As will be described for some of the embodiments, a video message, in some circumstances, may also include a structure, a template, a reference to either, some portion of either or related instruction for recreating a structure template at the receiver for a video message, in which case the term compound video message will be typically assigned to video messages meeting this description, and otherwise, the terms, video, or video message, may include reference to any or all of the above-mentioned extensions or additional media, including audio.

The following text, without restriction and for purposes of clarity, defines various terms utilised within this document in the context of video messages and associated video message structures. A video message is typically a linear, conventional message, as described above, which may contain one or several distinct topics, or topics which may be arbitrarily distinguished, and each topic may be represented by any reasonable textual description, reference or similar title, and preferably being distinguishable by same. A video message structure may include a software, hardware, computing entity, data stream, memory or storage configuration, a mathematical equation or equivalent capable of representing at least part of a hierarchical structure including one or more nodal entities (nodes) within the structure. Each node will be capable of containing one, two or a greater number of references to temporal points within one or more video messages, but without requirement to necessarily contain any, or any particular number of actual references. Each node will preferably contain or reference a label typically comprising a textual string. Throughout the various embodiments a typical method of creating an association between a video message and a video message structure will include an assignment of one or more references to temporal point(s) within a video message to one or more nodes within a hierarchical structure(s). The method will typically assign one temporal reference to one node to represent a zero-length temporal point within said video message or will typically assign two linearly-related temporal references to a single node to typically represent a video sequence beginning at the earliest reference and ending at the later reference within the sequential time-frame of the video message. Typically, the node for either typical case will also be assigned a label, typically describing the topic or content or position within some interpreted structure or other parameter relevant to the referenced sequential portion or reference point within the video message.

The nodes, topics or labels may be used interchangeably in some contexts, without restriction, to imply or combine or infer some or all properties of each or any to the extent that the implied or combined or inferred grouping of properties may be reasonably intended or understood to be practical or possible in the context.

The previously described hierarchical structure and any components thereof including nodes, references, labels, associations, etc may be partially or entirely visible and accessible to a user or may be partially or entirely invisible or inaccessible to a user, depending on issues including preferred design of any particular application of the invention and said visibility or accessibility may vary depending upon desired options and applicability to the particular application.

The video messaging components or systems described herein can be implemented on a large number of available computer systems and using any of a large number of computer languages, or alternatively, may be implemented by some hardware circuit(s) or a combined hardware and software implementation. At the present time, the inventors have implemented such a video messaging system using the Java programming language of Sun Microsystems Inc. (Java is a registered trademark). However the implementation of the present invention is not limited to any one specific computer system or computer language or hardware device, but can be implemented on any one of a multitude of combinations without departing from the scope and spirit of the invention. For example, the invention can be implemented using PASCAL programming language on a personal computer having a modem connected to a computer network via a telephone line.

First Embodiment

Referring to FIG. 1A, there is illustrated a first preferred embodiment of the invention in which a sender system 100 provides capture capability for video messages. The system 100 can be described as a sending station for video messages, but this description does not imply a requirement that the station transmit video messages, but rather provides a general description of the typical functionality and application of this embodiment. The sending station 100 for video messages is typically to be used to send video messages without also sending an associated or related video message structure as will be described. The present embodiment provides to a sender 103 enhanced capabilities including structured video capture, editing or otherwise manipulation capabilities of a video message, but sends or provides to a recipient of the video message a conventional linear (unstructured) video message.

The embodiment includes a video capture device, typically associated with an audio capture device, both being illustrated in FIG. 1A within a representative capture device 102. The capture device 102 is connected to a general purpose computing device 101 (e.g., personal computer). Alternatively, a specific, dedicated or embedded device designed to support the functionality as hereinafter described can be used to implement the present embodiment without departing from the scope or spirit of the invention. The video and audio capture system includes for example: a camera, camcorder or other visual and audio sensor system; and interfacing and conversion hardware and/or software components to interface with general purpose computing device 101 for providing control and data conversion facilities. The sending station 100 further includes a communication link 104 (or transmission link) to a computer network or alike for transmission of a video message to a recipient. Optionally, the communication of the video message can be effected by storing the message on a removable storage medium, such as a floppy disk 105, to be sent to the recipient by conventional methods (e.g., post). Other removable media include CD-ROM, CD-R, CD-RW, DVD and alike. The list of removable media is non-exhaustive and other memory capable can be substituted without departing from the scope and spirit of the invention.

The video messaging sending station 100 further comprises: a video and/or audio player for viewing the captured video message; and a message structure editor for editing a structure and/or content of the video message. Preferably, the video and/or audio player and the message structure editor is implemented in software as a software application on the general purpose computing device 101.

Figure 1B:
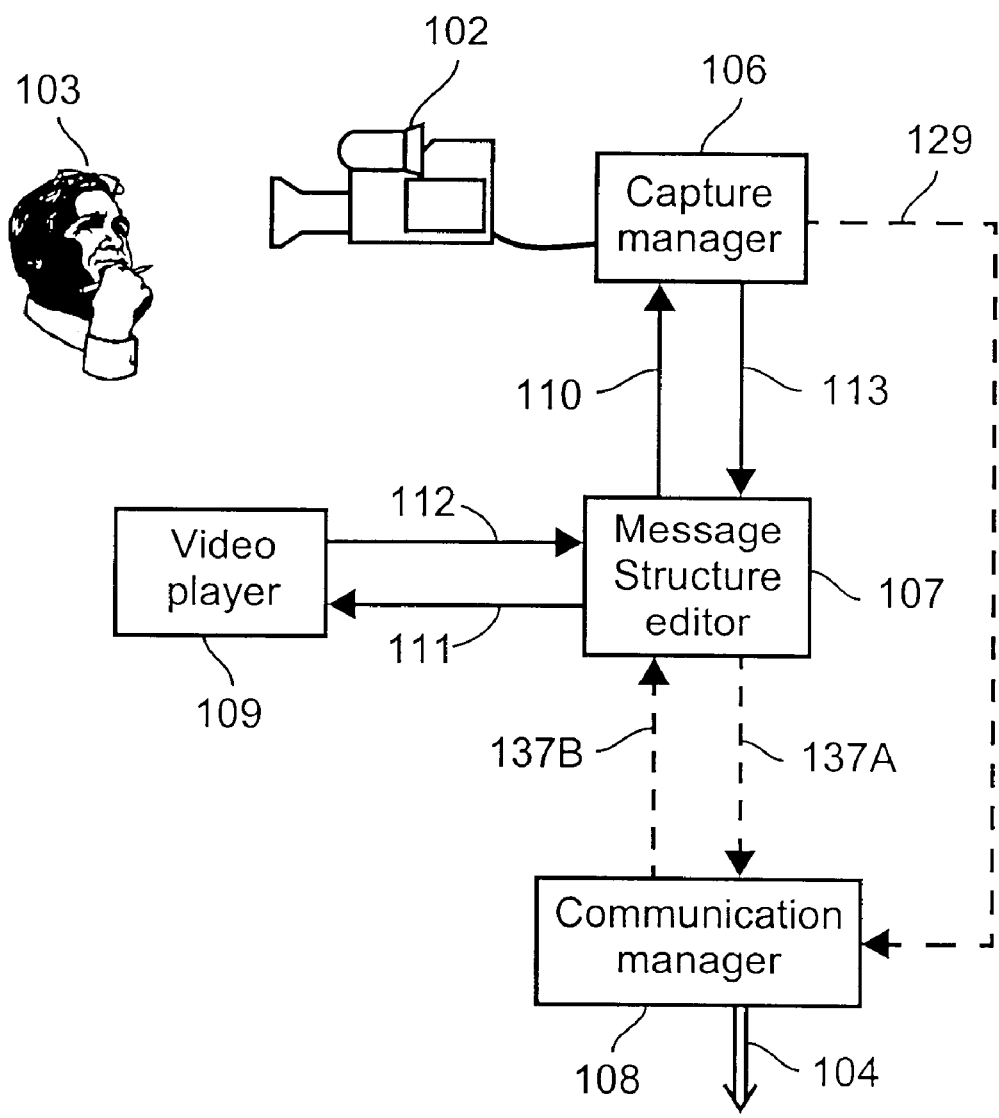
FIG. 1B is a block diagram showing components of the sending station of FIG. 1A.

Referring FIG. 1B, there is shown a capture manager 106, a video player 109, a message structure editor 107 and a communication manager 108. The capture manager 106 controls a capture device 102 to capture video data which is typically sent 113 to the message structure editor 107. In general terms, the user 103 can initiate an operation on a video message by performing a corresponding operation on the video message structure using the message structure editor 107. The message structure editor 107 interprets the user operation and sends commands 110 to the capture manager to capture a video message in accordance with the (created) associated video message structure or sends 111 commands and video data to the video player 109 so that subsequent video playing is in accordance with the video message structure. Operation of the video player 109 may result in commands or data flowing 112 to the message structure editor 107. For example commands may include: current position information, timing information and/or current play status (forward, reverse, stop, pause and video segment completed). The user 103 is able to initiate transmission of a video message, through a video data line 129, which is handled by the communication manager 108 to a network 115. Typically the transmission is of a linear video message, however, as described hereinafter with reference to the third embodiment, the associated video message structure can also be transmitted.

Figure 1C:
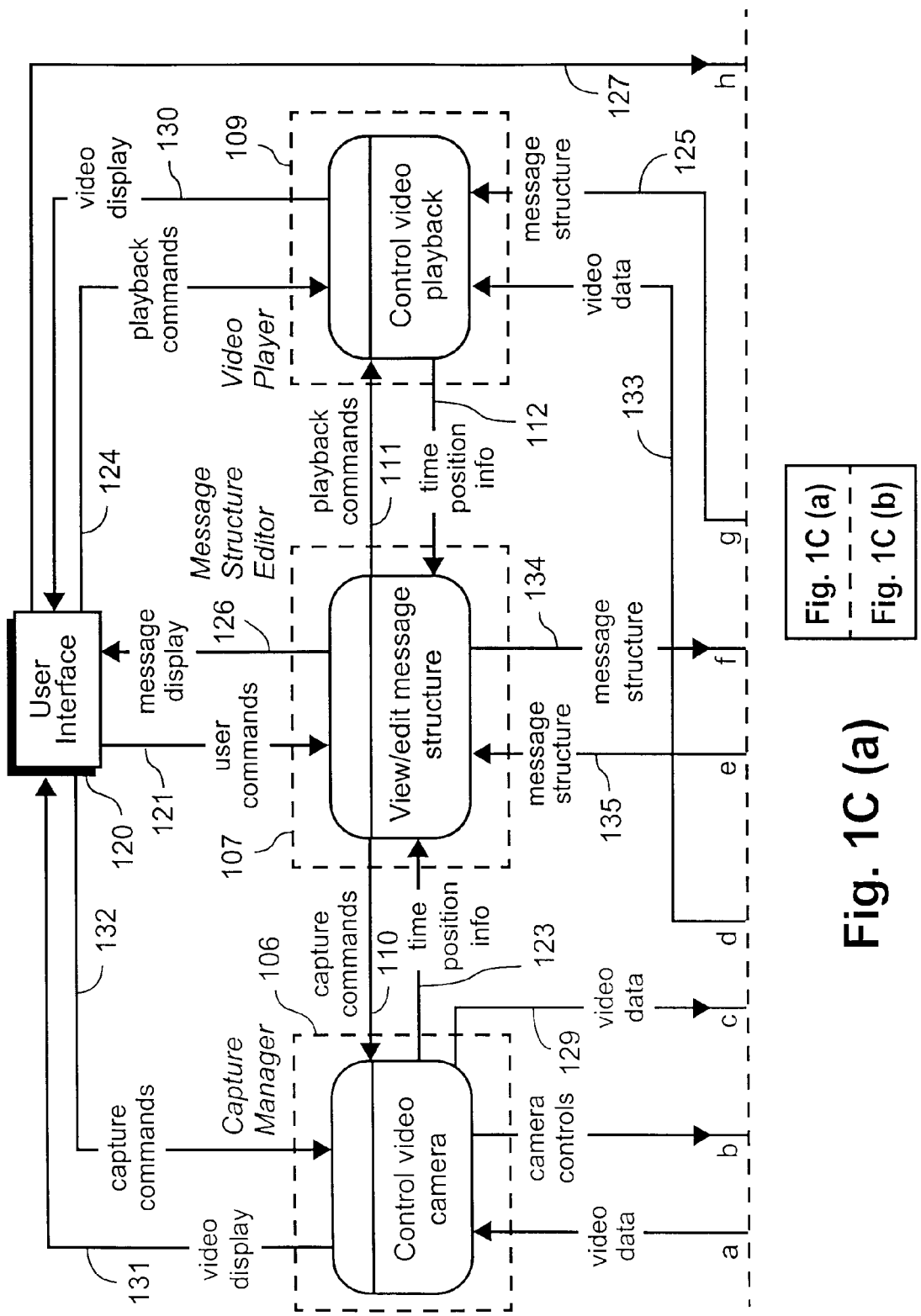
FIG. 1C is a block data flow diagram of the components of the sending station of FIG. 1B in more detail.
Figure 1C:
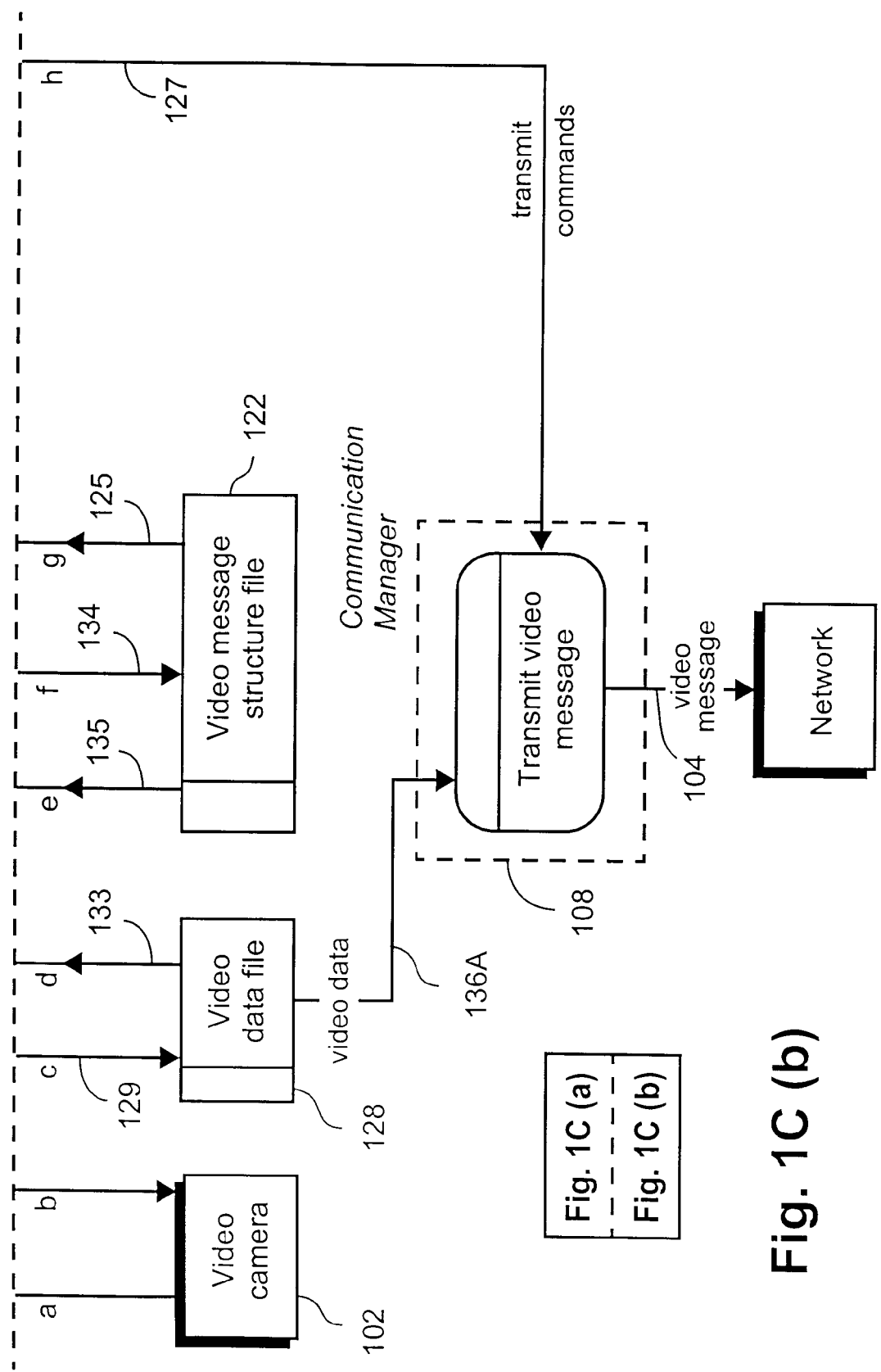

FIG. 1C shows a dataflow diagram performed during operation and the flow of data between the devices of FIG. 1B. However, before describing FIG. 1C in more detail, it is convenient to first describe some of the functionality and capabilities of the present embodiment.

Figure 2:
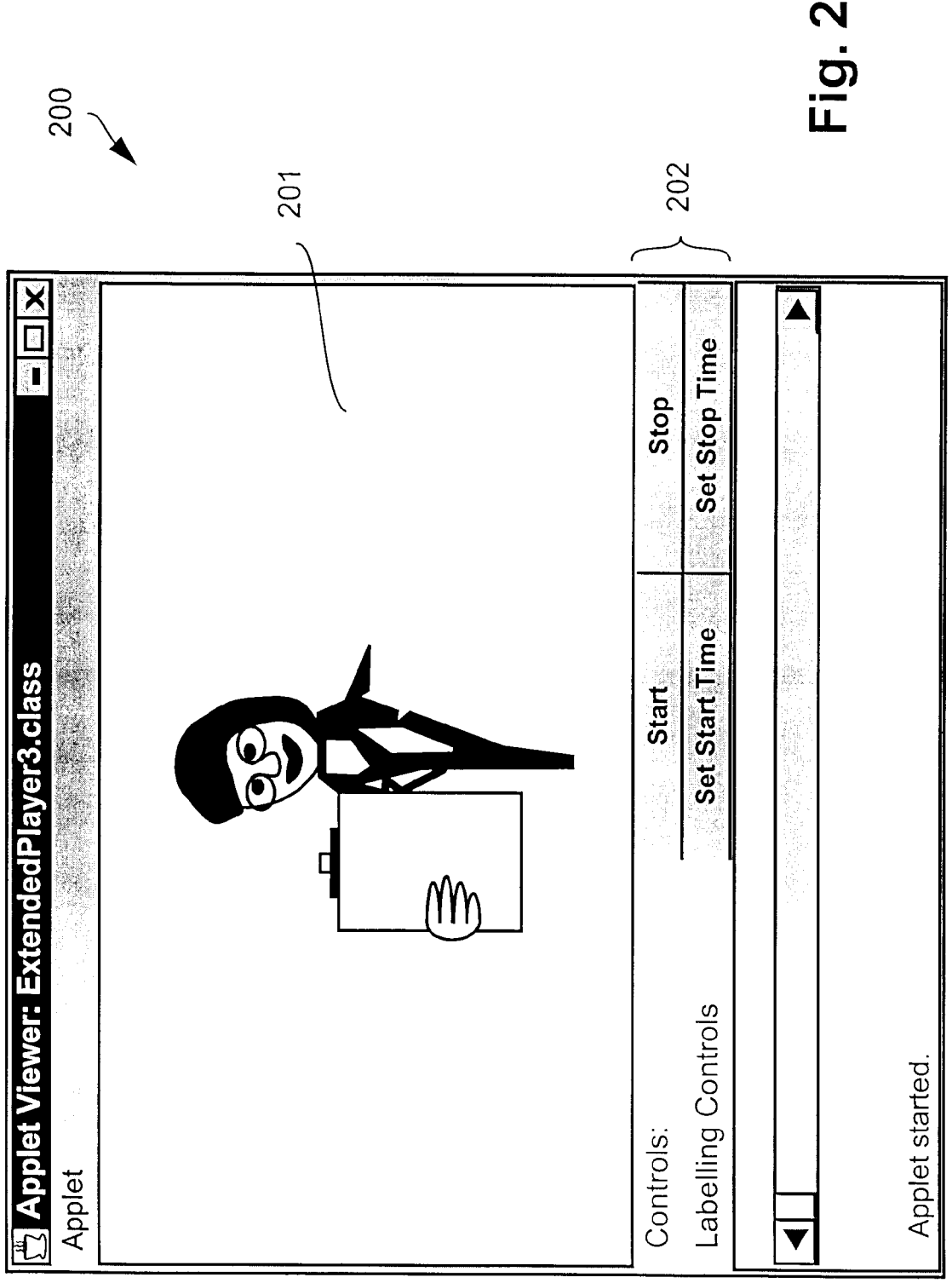
FIG. 2 is a diagram showing a graphical user interface GUI of a video player for the embodiments of the present invention.

Referring to FIG. 2 there is shown an example of the video player 200 implemented with a graphical user interface (GUI) on the computing device 101 of FIG. 1A. The video player 200 comprises: a viewing area 201 for viewing a captured video message; and a plurality of control buttons 202 for operating the video player 200.

Figure 3:
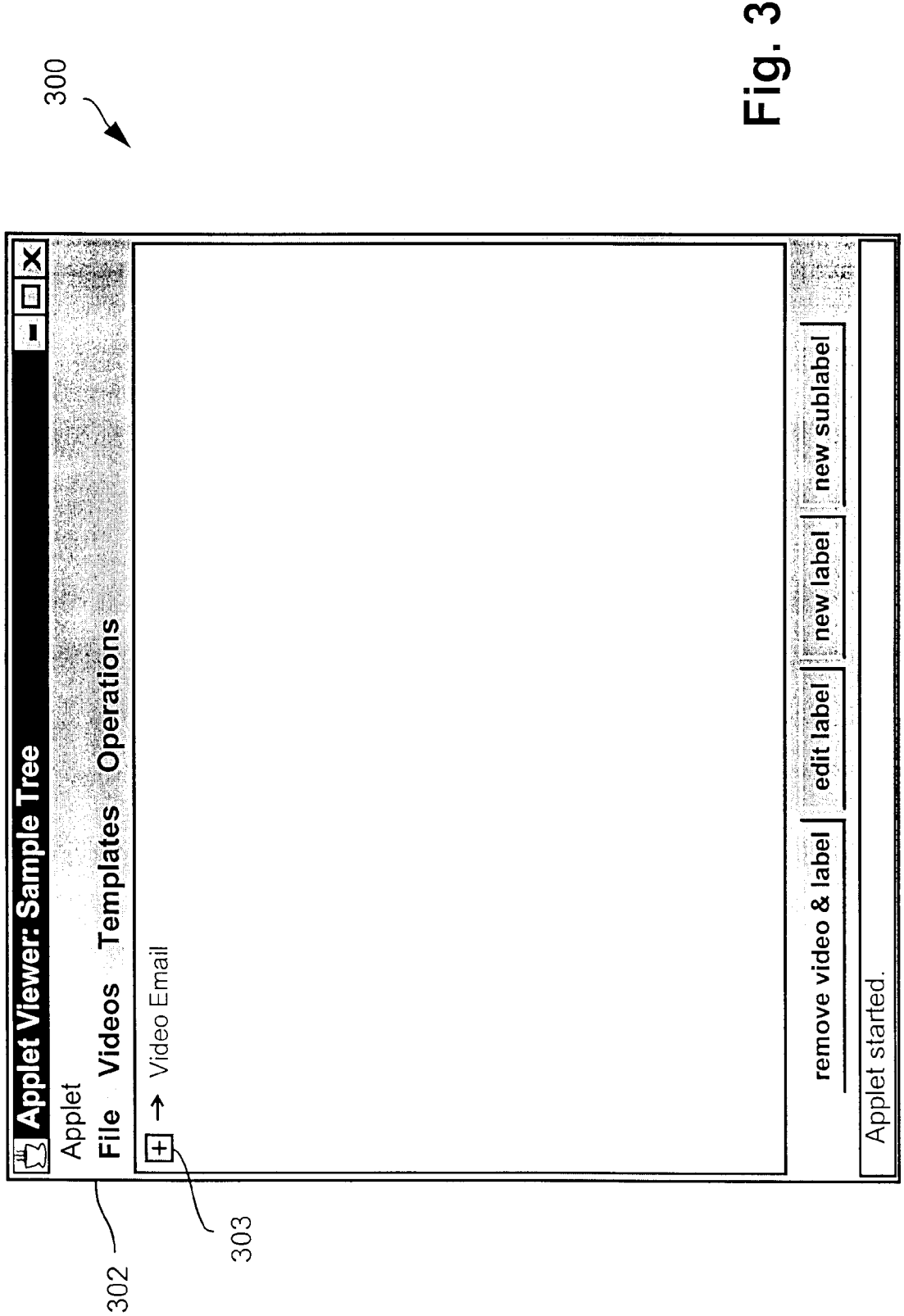
FIG. 3 is a diagram showing a graphical user interface GUI of a Message Structure Editor illustrating thereon a collapsed video message structure in accordance with embodiments of the present invention.

Turning to FIG. 3 there is shown a GUI for the message structure editor 300. The message structure editor 300 provides functionality for any one or all of the following functions: planning, capturing, labelling, navigating, editing, and annotating a video message by utilising a structural representation of the message or intended message. A plurality of buttons 301 and a "pull-down" menu 302 provides the user 103 (sender) the necessary control over the editor 300 to perform the functions described above and as well as other somewhat standard functions not so described (e.g. Save, Save As, New, Properties etc). FIG. 3 also shows a collapsed tree structure 303 (ie. the root node of the tree) of a video message in relation to the example to be described with reference FIG. 5.

A video message structure represents "themes" or "subject matters" of a video message as they appear sequentially in time and, when appropriate, as they are related from generic to specific in a hierarchical fashion.

Figure 4:
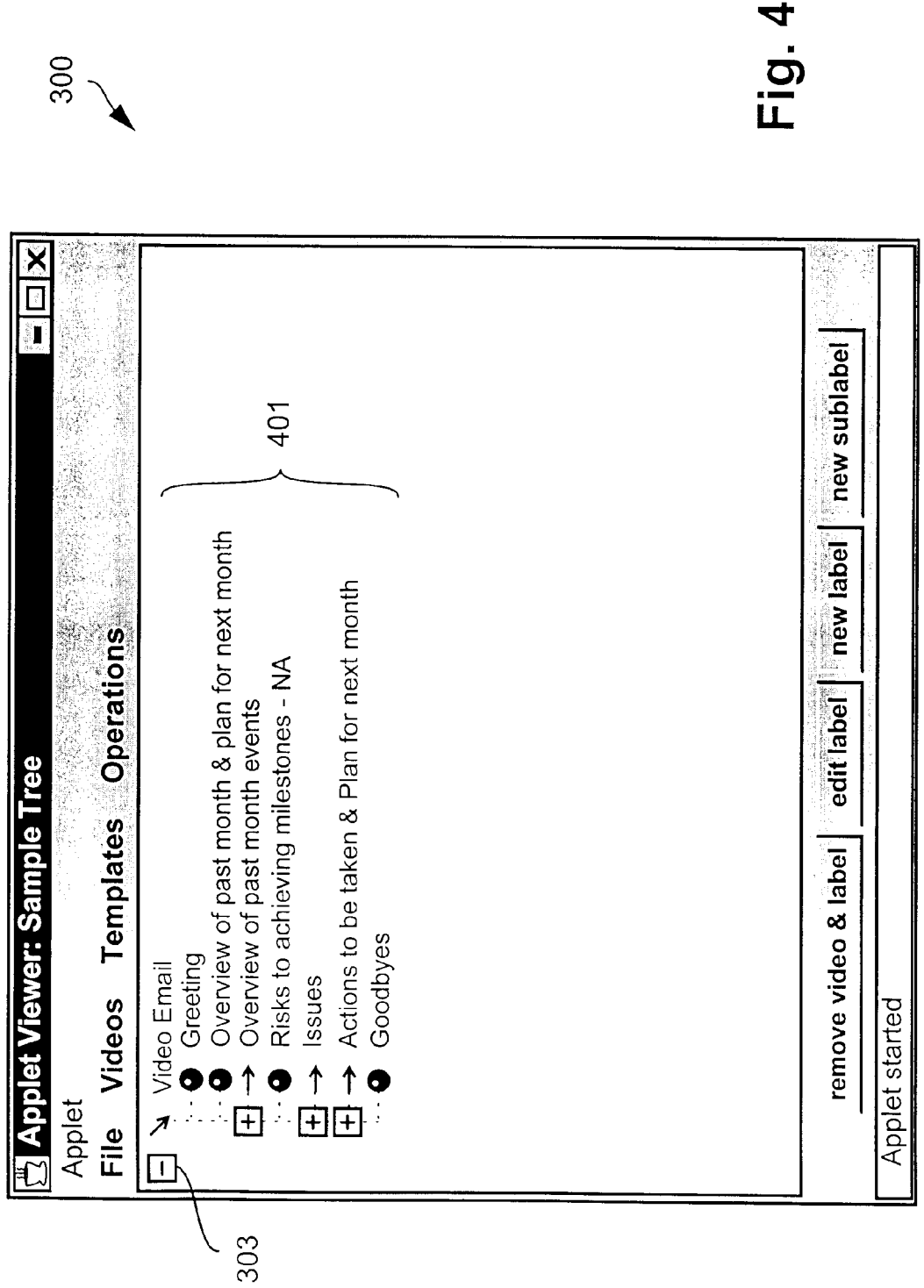
FIG. 4 is the GUI of FIG. 3 illustrating thereon a partially expanded video message structure.

Referring to FIG. 4, there is shown a partially expanded tree structure 401 for the collapsed tree structure 303 shown in FIG. 3 and represents an example of a video message structure that corresponds to the topic structure and content of a video message containing a progress report.

Figure 5:
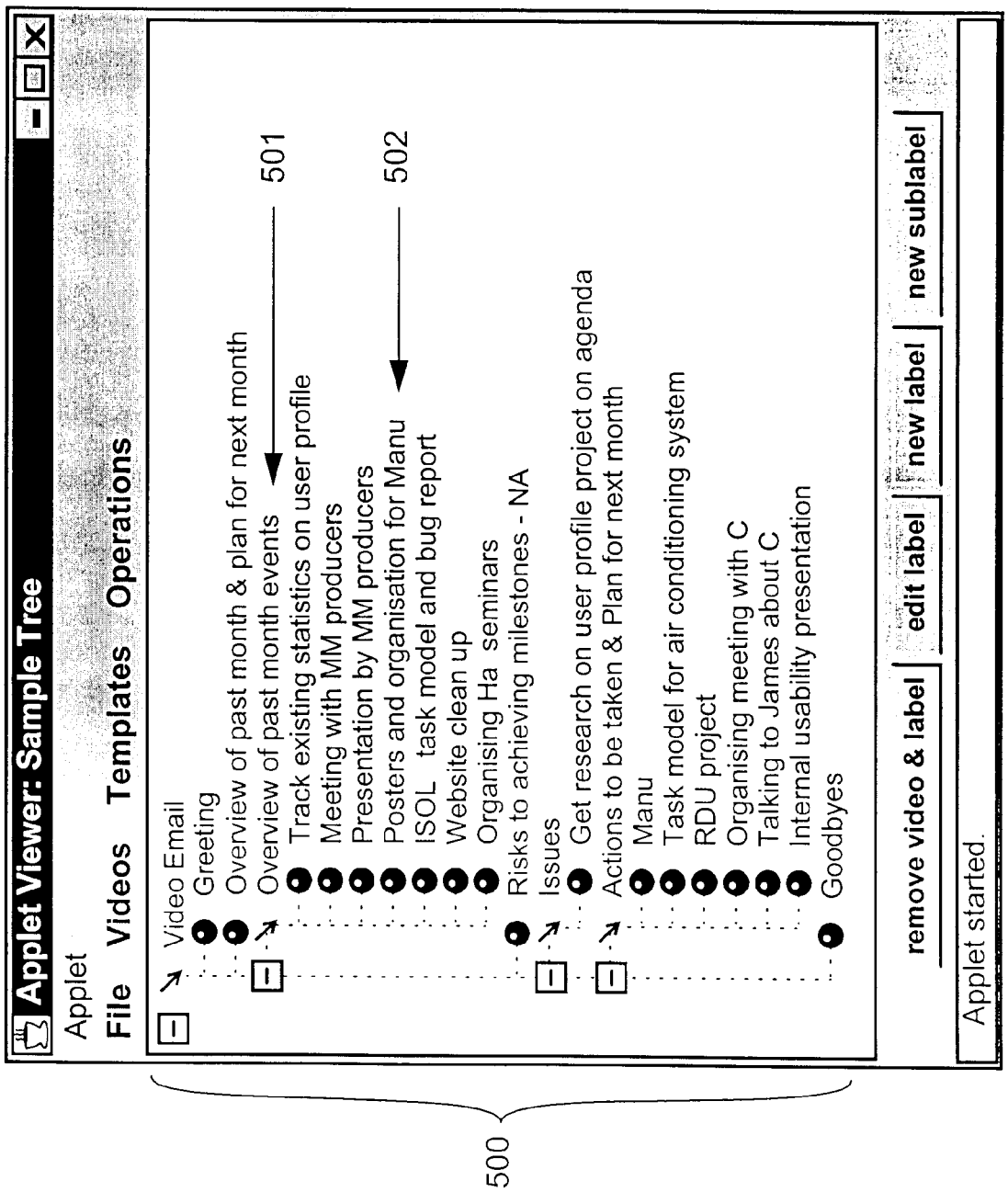
FIG. 5 is the GUI of FIG. 3 illustrating thereon a fully expanded video message structure.

FIG. 5 shows a fully expanded tree structure 500 of the example of FIG. 4. The tree structure 500 contains labels at several hierarchical levels indicating a useful declaration or implication about the video message structure, content or other (useful) dimensions. In the example of FIG. 5, the hierarchical structure indicates a major structural node 501 (and associated label) of the progress report video message as well as content headings (label) 502 within that structure 500. The example contains only sequence labels which are associated with a non-zero length of video message.

The Sending Station 100 will provide at least one and preferably all of the following video messaging capabilities:

Video message planning;

Video message capturing;

Video message labelling;

Video message navigating;

Video message editing; and

Video message annotating.

The above list of capabilities will be referred to hereinafter as "sending station structured video message capabilities".

Referring again to FIG. 1C which as previously described is data flow diagram for the present embodiment, there is shown a user interface 120 which allows the user 103 to interact with the sending station 100. The data flow is to some extent dependent operation requested by the user, therefore, the data flow for FIG. 1B will be discussed in more detail with regard to each of the sending station structured video message capabilities.

(i) Video message planning: the message structure editor 107, under control 121 of the user 103, creates and modifies a video message structure in memory and corresponding changes are made to a screen representation of the message structure at the user interface 120. The video message structure is also saved 134 to disk in a video message structure file 122. In the video message planning stage, there is no video message, so there is no need for the message structure editor 107 to exchange commands or data 111,112 with the video player 109.

(ii) Video message capturing: the capture manager 106, under control 121 of the user, initiates capture using the capture device 102. As the capture progresses, the video is saved in memory or to a storage device and time position information is sent 123 by the capture manager to the message structure editor 107. While capturing, the user 103 can indicate to the message structure editor 107, the topic that is about to be addressed. This indication can be made by clicking on a corresponding node label, of the created (modified) video message structure, using, for instance, a mouse. The message structure editor 107 then associates a reference to a time position within the video with the corresponding node of the structure.

(iii) Video message labelling: the message structure editor 107, under control 121 of the user, creates and/or modifies a video message structure in memory and corresponding changes are made to the screen representation of this structure as in the message planning stage. The user also controls 124 the video player 109 and video time position information is sent 112 from the video player 109 to the message structure editor 107. The time position information may be a single time point or two time points indicating the start and end of a sequence of video data. The message structure editor 107, under the control 121 of the user 103, is able to associate a reference to that time position, or references to those time positions, with a node of the structure selected or identified in some way by the user 103 (typically the selection of the node is by an input device such as a mouse).

(iv) Video message navigating: In this case, the message structure editor 107, under control 121 of the user (for example, when the user has clicked on a label which has a reference to a video position generated in part (iii) "video message labelling"), can send 111 a command to the video player 109 to start playing the video message from a specified time position. In addition, the video player 109 can read 125 the video message structure from a video message structure file 122. This allows the video player to display the label of the currently playing position within the video if this has been indicated as desirable by the user 103. Also, as a video message is being played by the video player 109, time position information is sent 112 to the message structure editor 107. The message structure editor 107 can use this information to indicate 126, within the displayed video message structure, the current position of the video being played.

(v) Video message editing: the message structure editor 107, under control 121 of the user, manipulates the video message structure in memory and corresponding changes are made to the screen representation of this structure. An existing or previously created video message structure can be read 135 from a video message structure file 122 and after any change to the structure, the message structure editor saves 134 the video message structure to the video message structure file 122 which the video player 109 can access. When the user 103 now uses the video player 109 to play a video message, the video message defined by the newly edited message structure (which specifies which sequences of video to play and in what order) is played. When the user 103 indicates to the message structure editor 107 that new video message contents are to be inserted into the message, the message structure editor 107 sends 110 a command to the capture manager 106 to start capturing video. When a capture is terminated, typically by the user 103, the capture manager 106 sends timing information to the message structure editor 107 and the message structure editor 107 associates references to a starting and ending positions of the video data captured to a corresponding node of the video message structure. Optionally, the timing information be sent to the message structure editor 107 upon each start and stop of the video capture process rather that when the capture is terminated.

(vi) Video message annotating: again, the message structure editor 107, under control 121 of the user, creates and modifies annotations that are associated with labels at nodes in a video message structure.

(vii) Video message transmitting: the communication manager 108, under control 127 of the user 103, transmits the video data from a video data file 128 which stores captured video data received 129 from the capture manager 106 and transmits the video data to an intended recipient(s).

The video player 109 extracts 133 from the video data file 128 the video data portion of a video message and sends 130 a video message to be displayed to the user interface 120. Optionally, the video data can be viewed, whether captured or not, via an additional path 131 from the capture manager 106 to the user interface 120. In addition to the video capture using a video message structure (ie. via the message structure editor 107), the user 103 has the option to direct 132 capture commands to the capture manager 109 to direct a capture of video in a manner analogous to conventional video capture devices. This option of direct capture of video data without the use of the message structure editor 107 can serve, for example, instances where video data is capture directly, stored and a message structure created at a later stage.

Figure 1D:
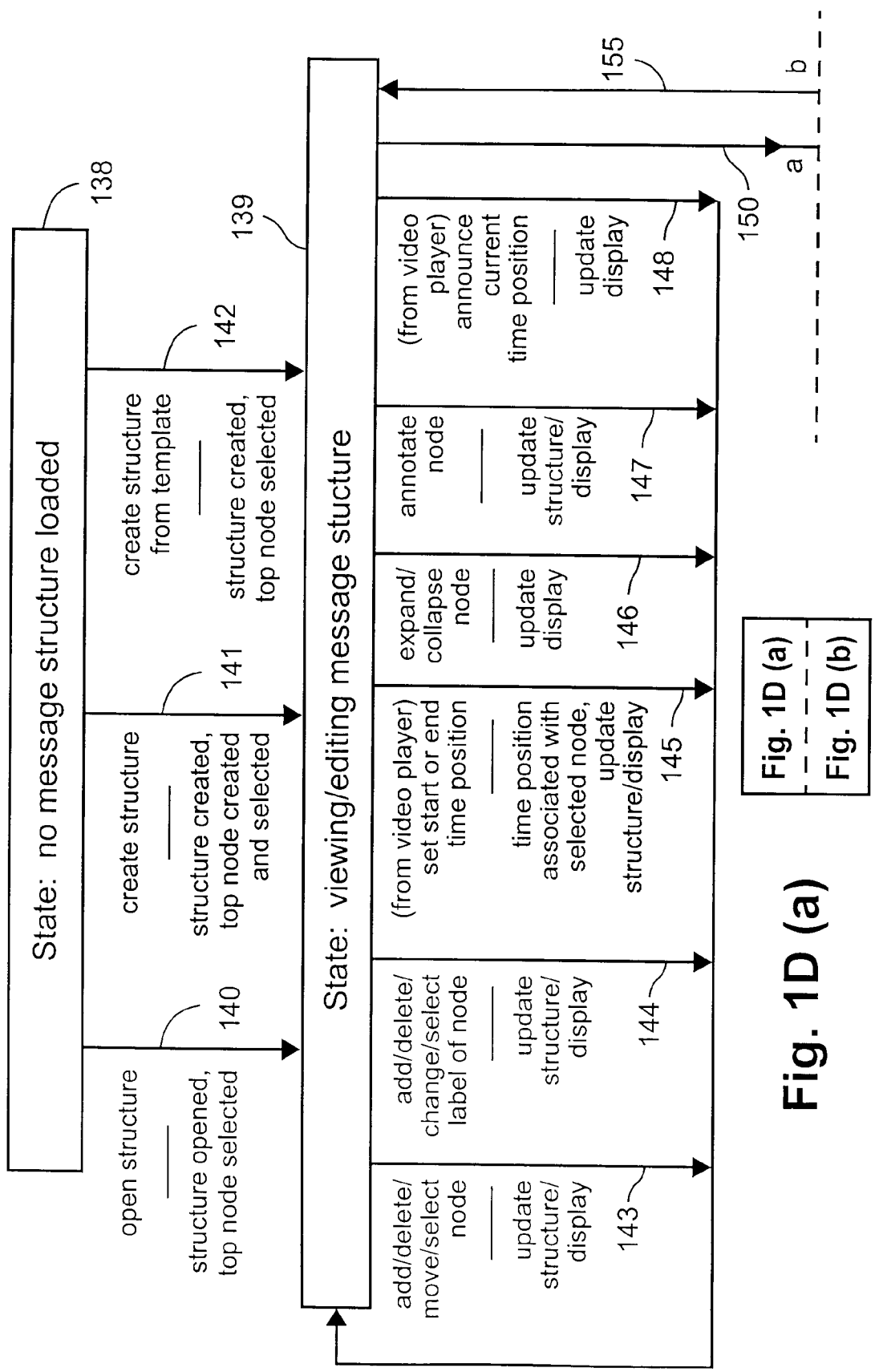
FIG. 1D is a state transition diagram of a message structure editor of FIG. 1C.
Figure 1D:
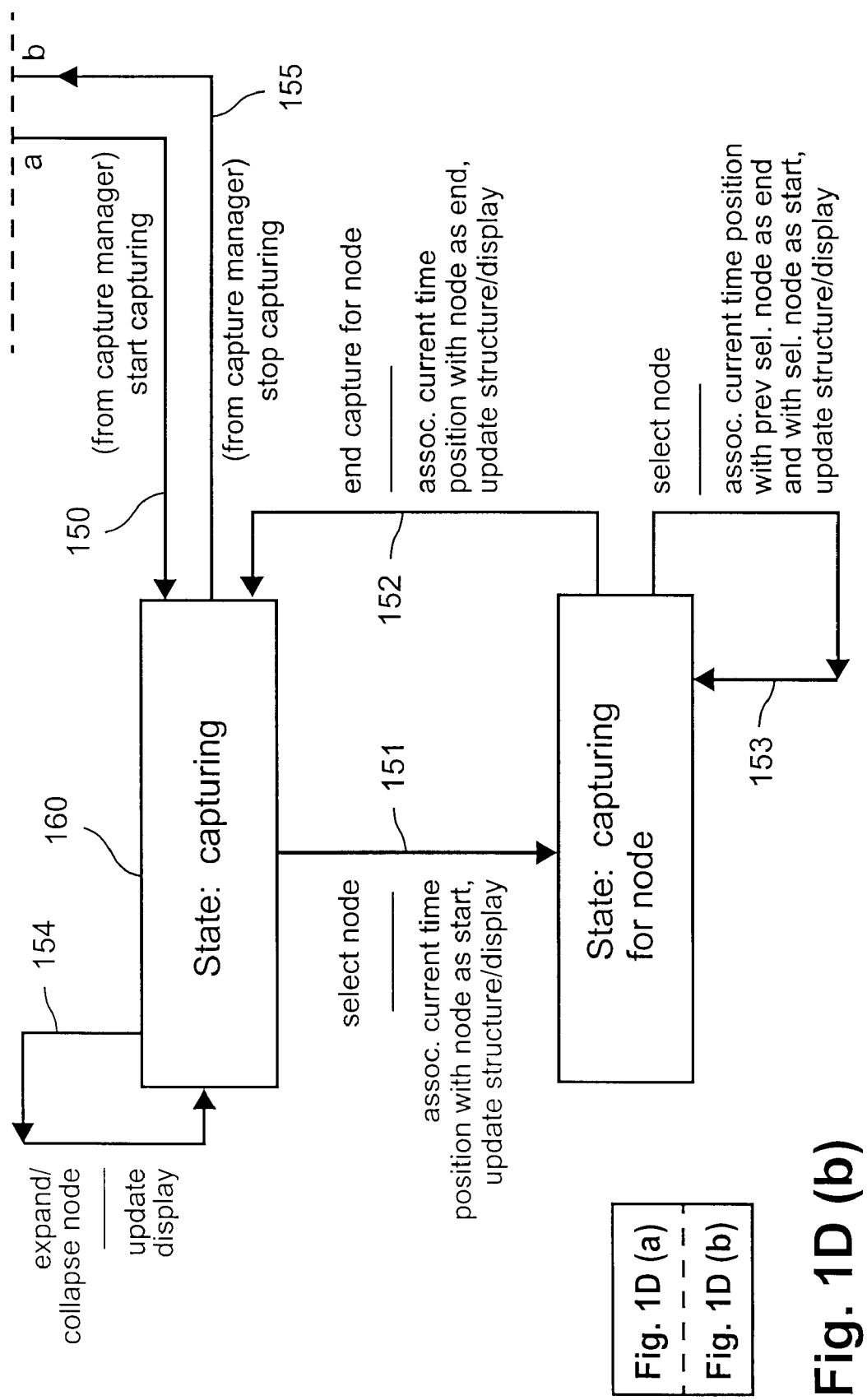

Turning to FIG. 1D there is shown a state transition diagram for the message structure editor module 107 of FIG. 1C. From an initial state 138 were no video message structure is loaded into the message structure editor, one of three options can be taken by the user 103 for viewing and/or editing a video message structure. The three possible options are: a) opening 140 an existing (ie: previously created) video message structure; b) creating 141 a new video message structure albeit an empty one (at least initially, until nodes, labels and timing information is associated with the structure and/or video data); or c) creating 142 an initial structure from a template (this option is described with reference to the fifth embodiment of the present invention hereinafter). Each of these three options puts the message structure editor 107 into a viewing and editing message structure state 139. In this state 139, the user 103 can then: add, delete, move and/or select a node 143; add, delete, change and/or select a label for a node 144; expand or collapse a node 146; or annotate a node 147.

Additionally, the video player 109 can direct 145 (via feedback commands on line 112) the message structure editor 107 to "set start time position" or "set end time position", as described above for "video message labelling" item (iii), a given time position is associated with the currently selected node.

Further, the video player 109 notifies 148 the message structure editor 107 of a current position of a video being played, as described above with reference to item (iv) "video message navigating", the display of the video message structure is updated to emphasise the corresponding node of the video message structure.

The capture manager 106 notifies 150 the message structure editor 107 that capture has been started, the message structure editor 107 enters a "capturing" state 160. In this state 160, when a node is selected, the current time position is associated with the node as its start position and the display (user interface) 120 is updated to indicate that the captured video is to be associated 151 with this node. When the user indicates that capturing for this node is completed or that capturing for another node is to begin, the new current time position is associated 152 with the node as its end position. In the latter case (ie. capturing another node), the new current position is also set 153 as the start position for the newly selected node.

Optionally, during capture, the video message structure display can be modified, for example, by expanding and collapsing nodes 154. The display is updated accordingly.

The capture manager 106 notifies 155 the message structure editor 107 that capture has ended, the message structure editor 107 returns to the state for viewing and editing the video message structure 139

The sending station structured video message capabilities can be used, for example, by a video message sender 103 for creating video messages. Such video messages can be viewed using conventional video playing techniques (for example, VCR-like controls) provided by conventional "user interfaces" video playing tools and/or applications represented by the GUI of FIG. 2.

A video message structure, whether created by a sender prior to capturing a message, by a sender subsequent to capturing a message or by another predetermined mechanism (e.g. automatic node/structure generation by specific events in a video message, like a transition from one shot to another), provides a representation of a video message and can be used for forms of automated processing of that message. For example, a video message structure can be used to provide an index for a video message that can later be used to facilitate searching for message content. For another example, a video message structure can be used as a basis for routing a video message to a specific person or role within an organisation (for example, as part of a call centre function).

Additional features of the sending station video message structure and the associated functionalities and capabilities in accordance with the first preferred embodiment will now be described in more detail.

Video Message Planning

Video message planning allows the user to create and modify a structure that represents the intended structure of topics for a video message to be captured. This structure could take the form of a list of topics or could be a hierarchical structure with nested topics with any number of levels. This structure can then be used by senders of video messages when capturing a video message. FIGS. 3, 4, 5 show an example structure at varying levels of hierarchical expansion. In FIG. 5 the entire tree structure is apparent, showing topics (labels associated with topics) at all levels.

The operations available to a user for video message planning include:

- Creating a video message structure
- Adding a new node
- Removing a node
- Moving a node within the structure
- Labelling a node
- Changing the label of a node
- Removing the label of a node
- Showing or hiding specific sub-trees of the structure by expanding or collapsing nodes Video Message Capturing Video message capturing allows the user to record a message utilising the video message structure. While recording, the sender 103 can indicate when they start a new topic (for example, clicking on the node in the structure representing the topic commenced). This indication allows the system to create an association between topic nodes in the structure and the corresponding time positions in the recorded video message.

The video message structure can also be used purely for providing the sender 103 with guidance while recording the message. Correspondences between time positions within the video and nodes of the structure might be made after capture is complete (discussed under "video message labelling").

A variation (optional) for providing associations between the message structure and the video message involves the sender 103 indicating to the system when they start or stop a new topic and having the video capture start and stop at the time that indication is made. This results in separate shots of video for each topic within the message rather than a single shot as in the technique above. A combination of these two approaches can be used.

Video Message Labelling

Video message labelling allows the user 103 to create nodes within the video message structure representing a video message and to create labels (textual or otherwise) for these nodes. These nodes are associated with specific points or sequences in the video message and the label can be used to describe or augment the video message content at that point or within that sequence. These labels can be used for subsequent navigation, editing, etc.

The operations available to a user include those identified above for video message planning with the additional capability that nodes, and hence labels, can be associated with a specific position or sequence within an existing video message. The means for a user to indicate the specific position or sequence within the video message include the use of the current playing position of the video, user-marked in-points and out-points, and any other form of indication of video positions or sequences.

Video message labelling can be made available to the sender 103 of a video message in order to create a video message structure for their own use for performing structured video message capabilities (such as navigation and editing).

Video Message Navigating

Video message navigating allows the user 103 to cue to a position in the video message using the video message structure (for example, by clicking on a node in the video message structure, the playing of the video message could be cued to the corresponding position within the message).

During navigation, the display of the video message structure can be manipulated by a user, for example expanding a node to show the partially expanded tree structure 401 (or sub-tree) of FIG. 4 or hide the sub-tree in the collapsed tree structure 303 of FIG. 3.

The display of the video message structure can also be modified to provide feedback to the user with regard to the current position within the video. For example, the current position within the video can be indicated on the video message structure display by showing a Karaoke-style "bouncing ball", or the node corresponding to the current position within the video could be highlighted in some way.

In addition, when a video message is being played, the label from the node corresponding to the current position in the video can be displayed near the video display. This can, for example, take the appearance of a caption below the video, above the video, beside the video or overlaid on top of the video.

Video message navigation can be made available to the sender 103 of a video message.

Characteristics of the Video Message Editing Process

Some of the characteristics of editing of (asynchronous) video messages include:

- Typically comprises a single source of video—i.e., the video would usually have all been shot at the same sitting even if in multiple takes.
- Typically comprises a single stream of media—e.g., there would not usually be overlaying of a part of an audio track onto a particular portion of a video track.
- The editing typically happens in the same place and around the same time as the capture. Therefore getting more footage to make a point is often easy and straight forward.
- Video messages can be sent often but the editing of them is typically performed on an occasional basis. So editing should be a simple extension of normal sending rather than a task in its own right.
- The changes made to the source can be minimal (for example, deleting one sentence).
- The objective is not the creation of a well-crafted production but rather the creation of an effective message and issues such as the aesthetics may typically not be of high importance. This can result in there being more of a focus on rapid (and possibly rough) editing as opposed to careful precise frame-accurate editing.
- The expected users of video message editing are unlikely to have special editing skills, as opposed to users of conventional (synchronous) video editing tools who would probably have received specialised training in the editing process.
- The main message content is likely to be in the audio component, with the video component enriching the message.
- The person appearing in the video is usually the same person as the editor. This can affect aspects of what type of footage is cut out as influenced by the user's conception of themselves.

Video Message Editing

Video message editing allows the user to manipulate the video message structure in order to delete a sequence in a video message, move a sequence in the video message to another location within the message, extract a sequence from a video message to be used in another message or be used by another application. The user 103 can also use the video message structure to position an insertion point for further video capture, the captured video being placed at that position within the video message.

Figure 6:
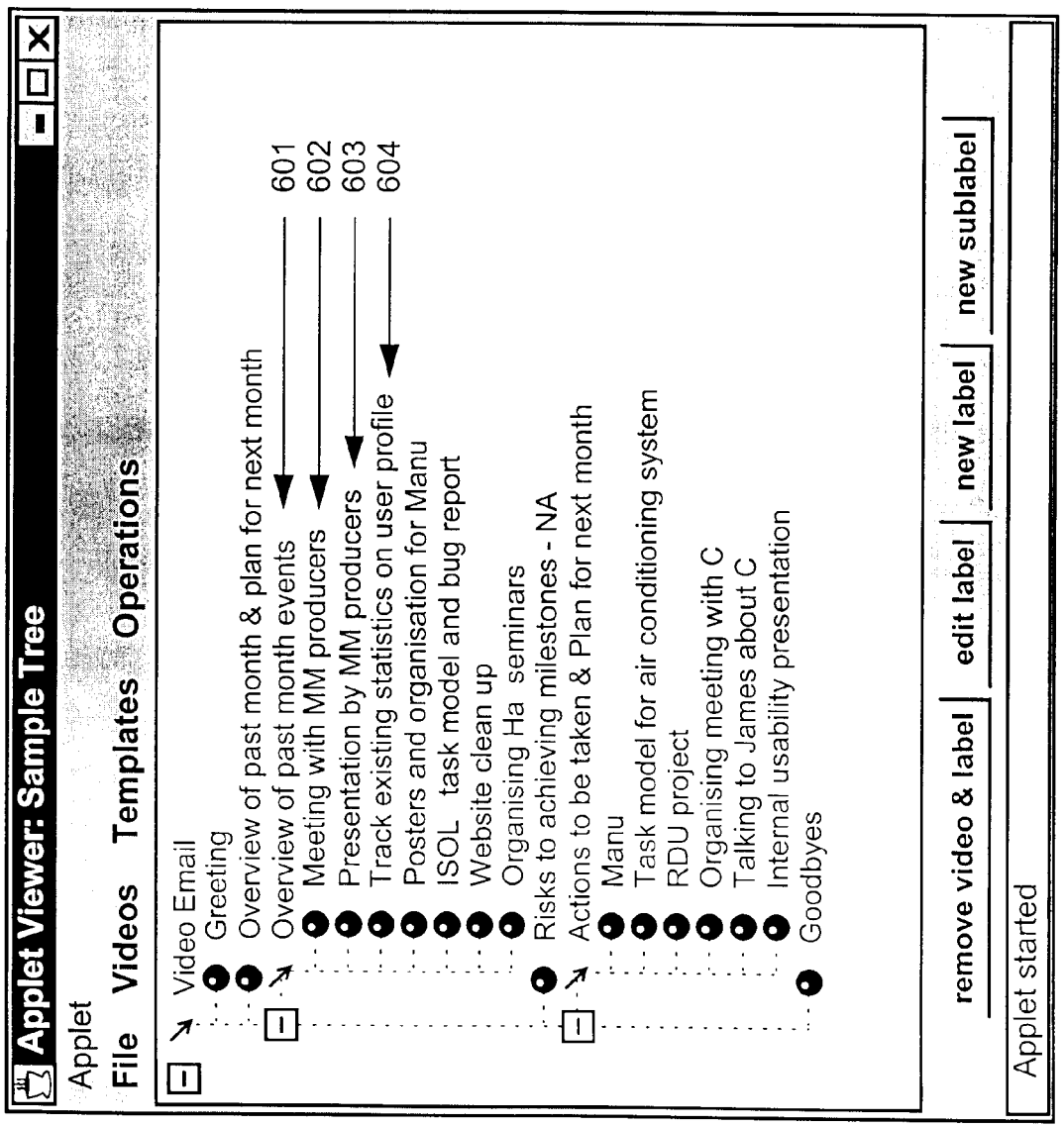
FIG. 6 is the GUI of FIG. 5 illustrating thereon an expanded video message structure showing a labelled node of a video message structure prior to deletion.
Figure 7:
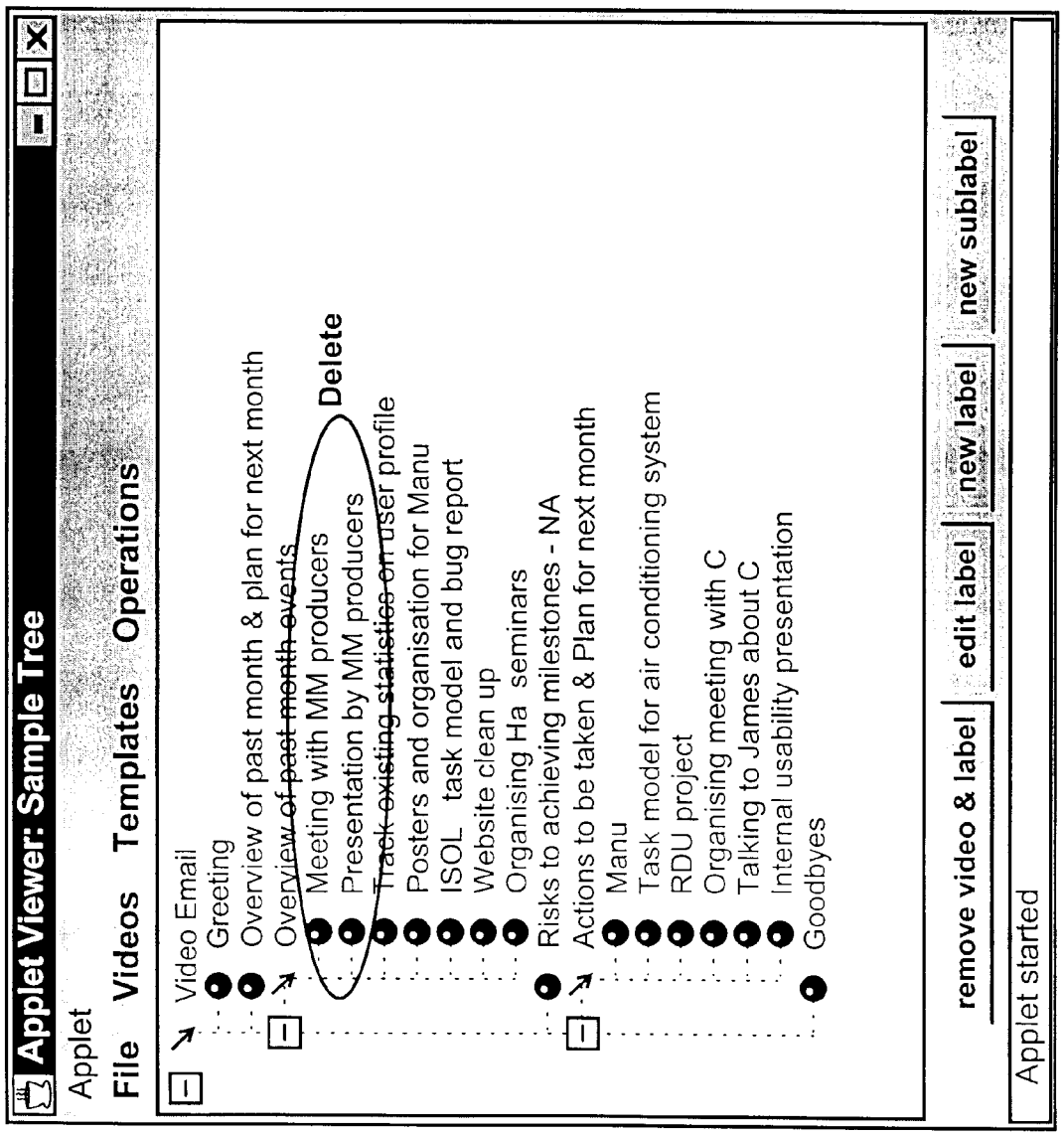
FIG. 7 is the GUI of FIG. 6 illustrating thereon an expanded video message structure showing a labelled node selected for deletion.
Figure 8:
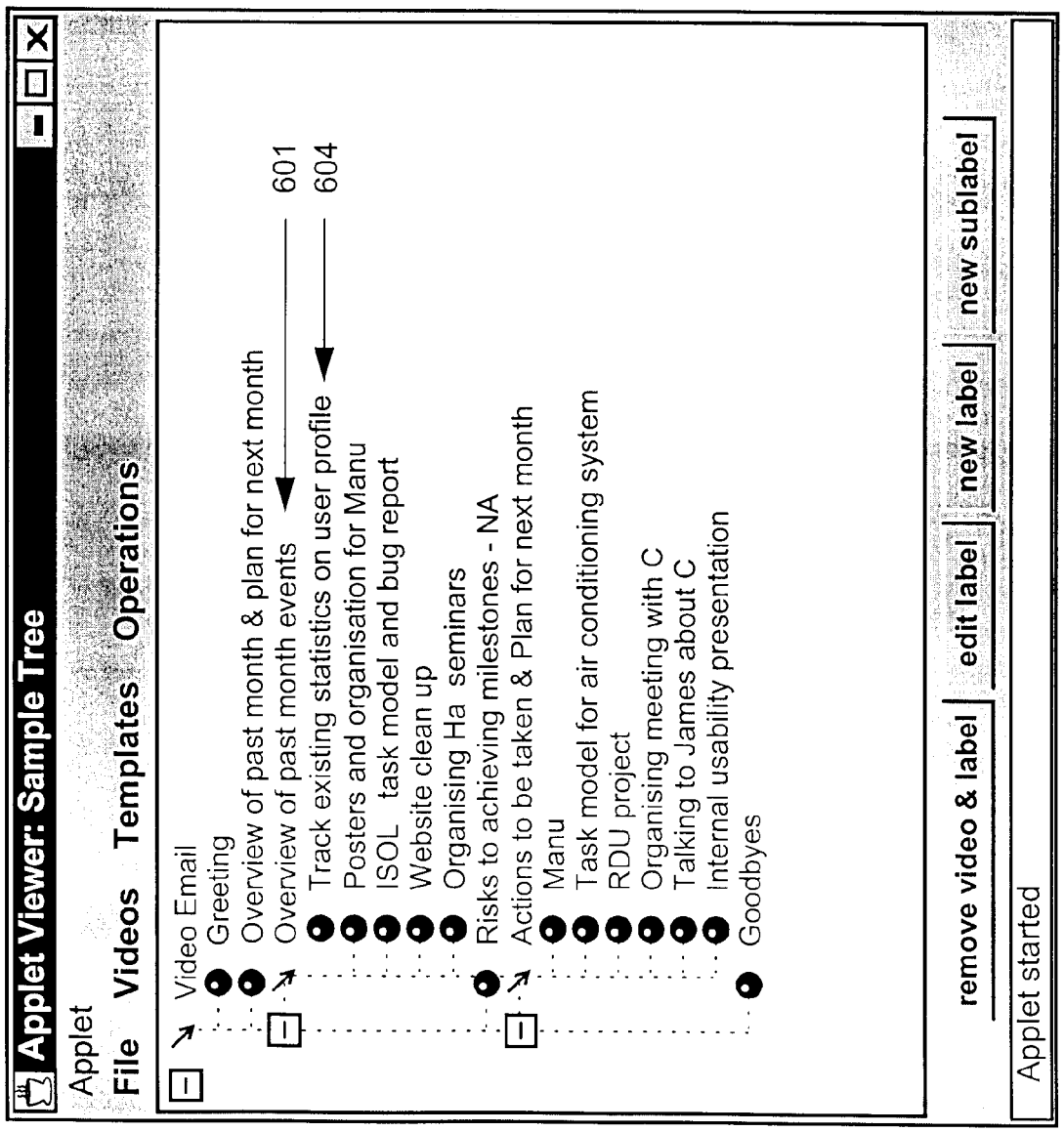
FIG. 8 is the GUI of FIG. 7 illustrating thereon an expanded video message structure showing a labelled node prior to deletion.

In the present embodiment there is a distinction between manipulating the video message structure without altering the video message (as is described above within "video message planning") and manipulating the video message structure when the objective is to perform an analogous operation on the corresponding video message. For the latter case, an example is indicated in FIG. 6, in which portions of the video message structure, 602, 603 are to be deleted. This operation will also delete or make unavailable the portion of the video message corresponding to the label or labels, 602, 603 deleted from within the video message structure. FIG. 7 indicates the structure portions to be deleted and FIG. 8 indicates the result following the deletion in which labels indicated by reference numerals 601 and 604, previously separated by two nodes (labels) 602 and 603, are now adjacent nodes of the tree. Note that the exact effect on any video or audio message portion formerly corresponding to a deleted portion of a structure (e.g. 602, 603) may be optional. For instance, the corresponding video or audio portion may actually be deleted from a file or other media, or the corresponding video or audio portion may be skipped or not accessed during subsequent playing, but without being removed or deleted within a streaming, file-based storage, presentation or transfer of video and audio associated with a video message structure.

Preferably, the message editing support can be used to allow the user 103 to craft a message in substantially the same way that most users craft "textual electronic mail" (or email) messages by adding here, taking away there, moving here and/or generally making the message say something that they are satisfied with sending.

Figure 9:
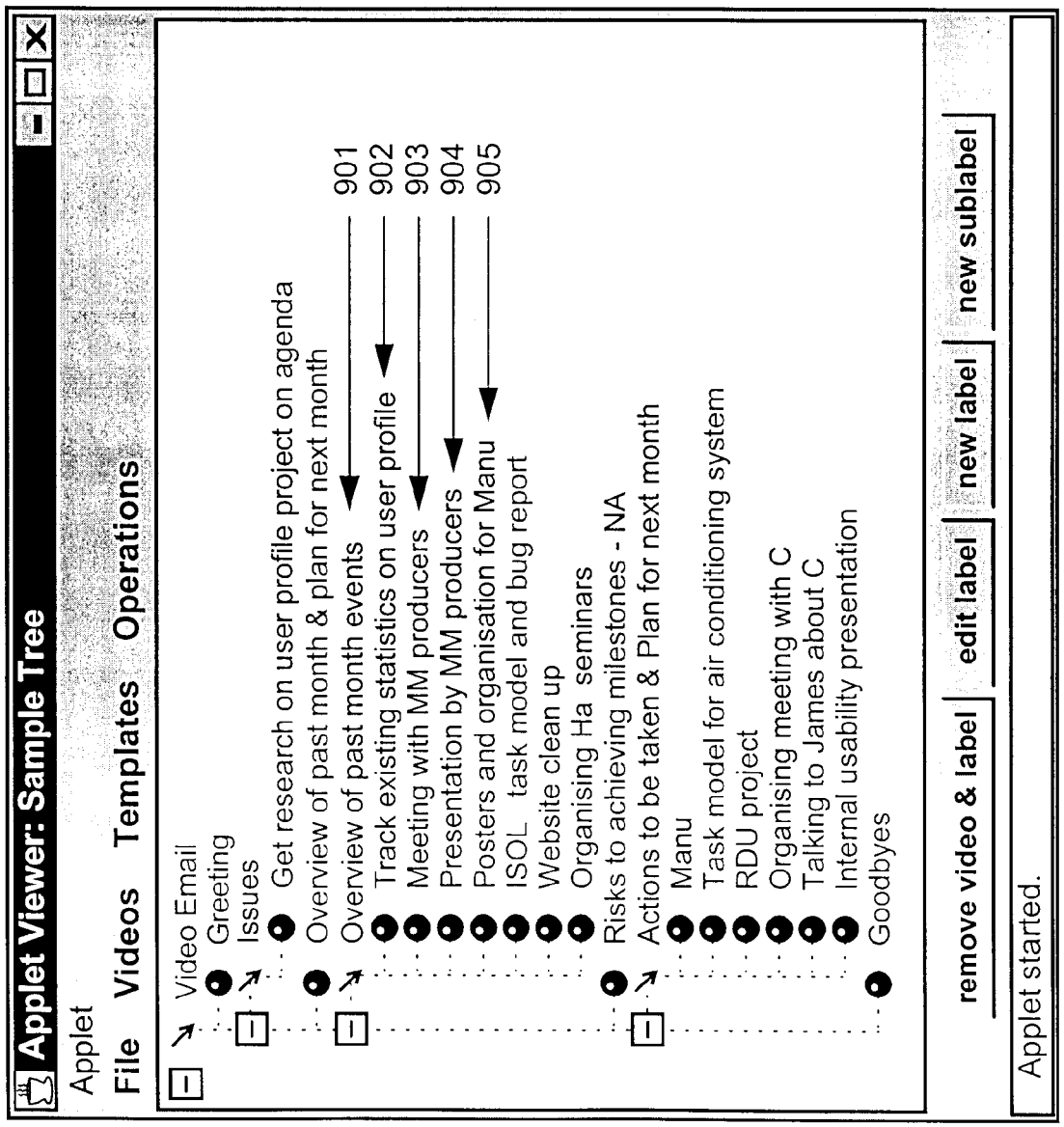
FIG. 9 is the GUI of FIG. 8 illustrating thereon an expanded video message structure showing a labelled node prior to a move operation.
Figure 10:
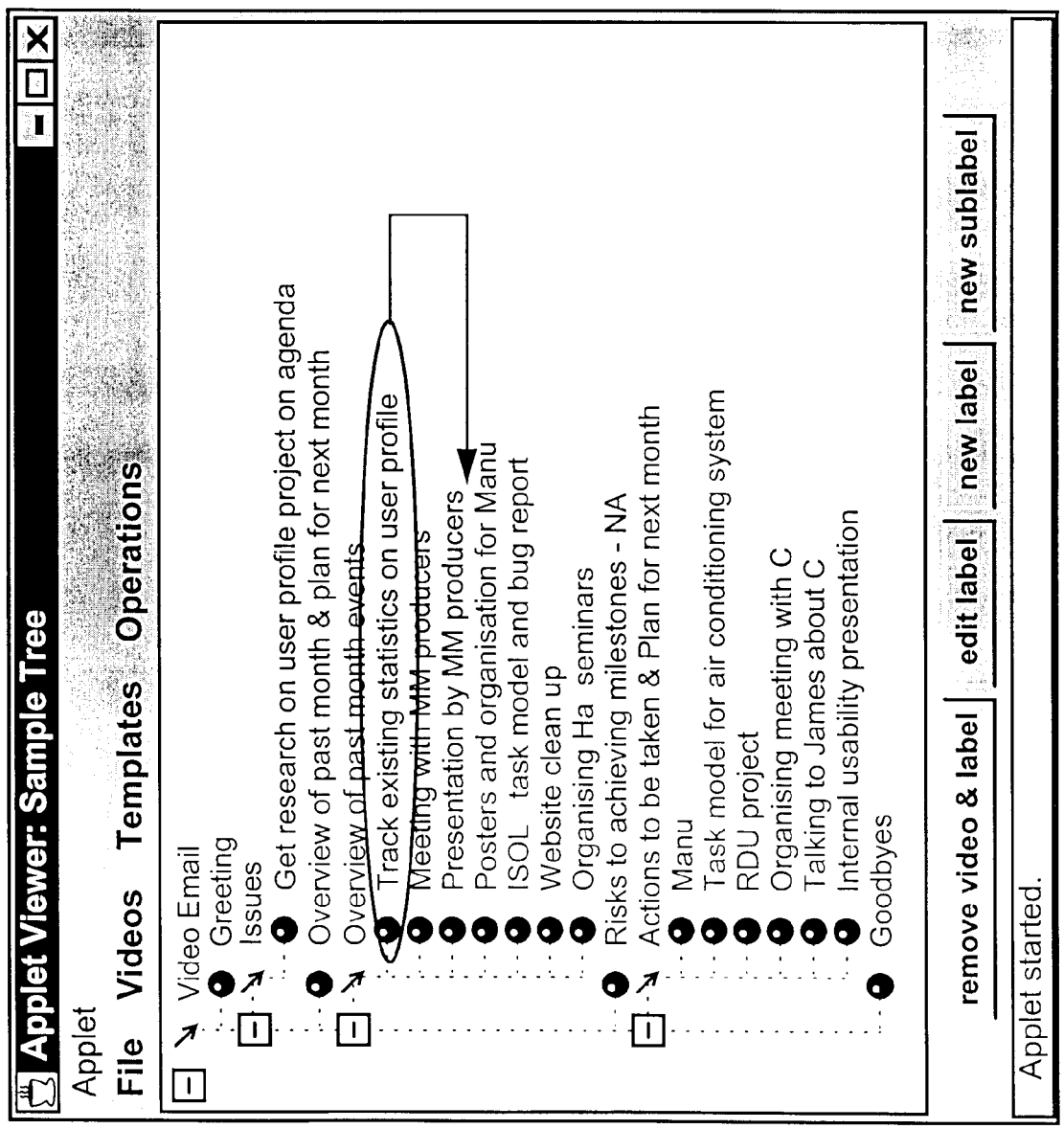
FIG. 10 is the GUI of FIG. 9 illustrating a labelled node selected for a move operation.
Figure 11:
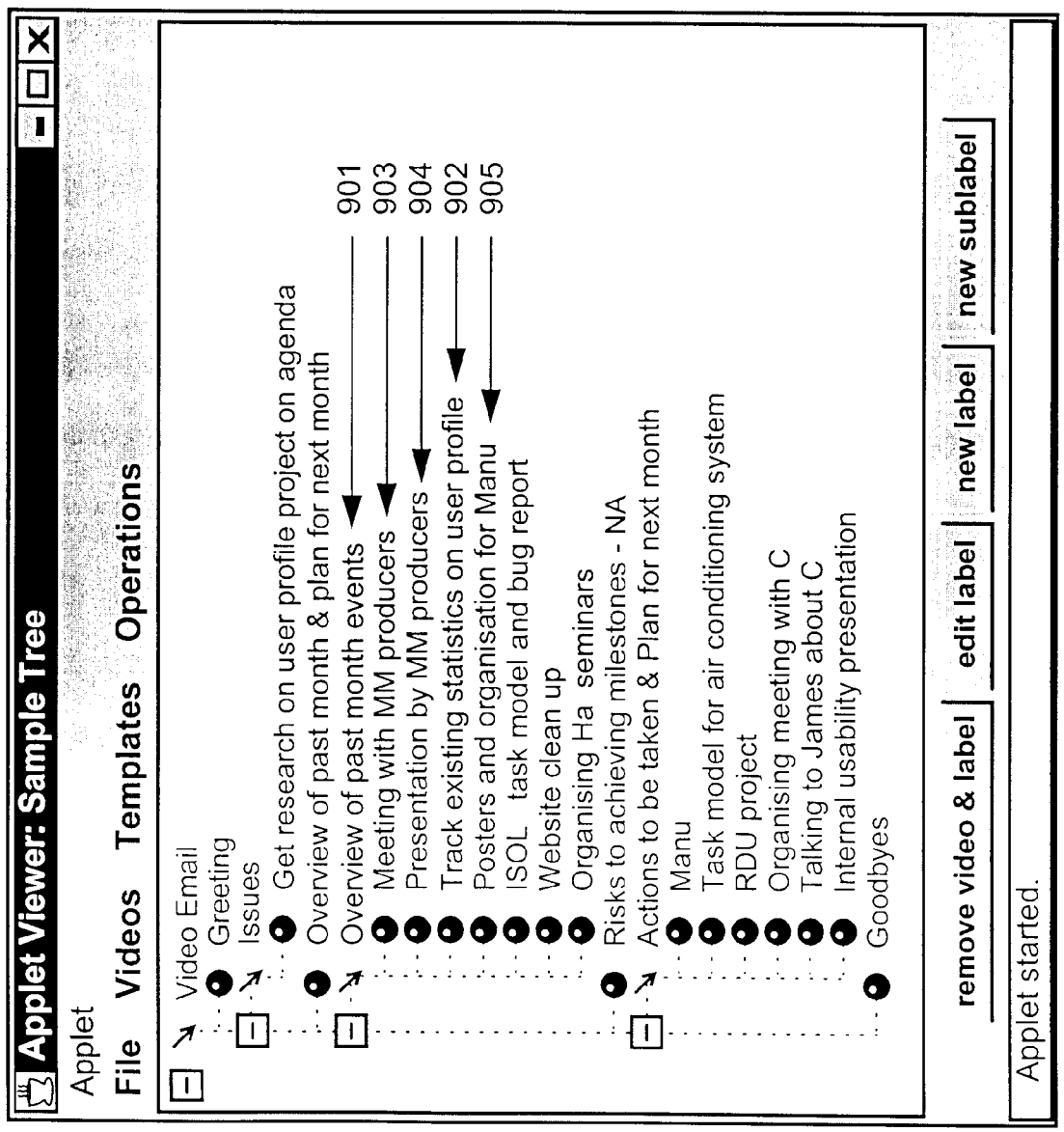
FIG. 11 is the GUI of FIG. 9 illustrating the video message structure after the move operation.

As discussed above, users can utilise the tree structure to manipulate a video message in accordance with the preferred embodiment. Thus, users can select, expand, and collapse a tree node by clicking (i.e., selecting with an input device such as a mouse (not shown)) on a specific portion of the structure. After a tree node has been selected, users can either move it to a new location by dragging and dropping, delete it, or change its label. Note that in the preferred embodiment the insertion of the selected node is to enter a position before the node where it is dropped ("drag and drop"). It is envisaged, however, that other equally appropriate or desirable techniques of interactivity or control during a move function can be adopted without departing from the scope and spirit of the invention. For example, a cut and pasting on the nodes (or label) to effect a move function. FIG. 9 indicates an example tree structure prior to a portion of it being moved. FIG. 10 indicates the portion to be moved, corresponding to 902 in FIG. 9. FIG. 11 indicates the result after the move operation, note the modified sequence of marked portions 901 through 905 compared to the sequence prior to the move shown in FIG. 9.

Video message editing can be made available to the sender 103 of a video message in order to assist in the creation of a video message.

Video Message Annotating

Video message annotating allows the user to provide annotations on the nodes of a video message structure with these annotations providing additional information for the maker of the annotation or others.

A conventional text "email" may be subjected to various forms of processing by user. These include reading it, performing actions requested within the message, performing actions necessary because of the content of the message, replying to it, using its contents in further activities, storing it in such a way that it can be found at a later date, forwarding it and destroying it.

Similarly, a video message can be subjected to this type of treatment. There are, however, difficulties that arise due to the time-based nature of the video content. For example, in the case of text emails, there would usually be an initial reading of the message and, if there are requested or required actions, these would often be done in conjunction with further readings of parts of the email. To enable the same form of handling of video emails, it is important that the video message be able to be quickly navigated and key locations within the video found quickly. This functionality is largely provided by the use of the video message structure of the preferred embodiment and annotation additionally provides the user or some automated mechanism with one or more capabilities to operate on a label(s) within a structure. Such operations may include addition of text or other material (e.g. a sound effect), or operation of a function to modify one or more properties of said label (for instance highlighting of text, animation, font changes, etc). The purpose of annotation is typically to allow the user or an automated mechanism to show or record some statement or reference against a labelled node within a structure, said annotation indicating status or user intent or instructions as described above for actions relating to a message.

Annotation of a message by a user can be done to serve any of several functions: procedural signalling for future attention; placemarking and aiding memory; paraphrasing, summarising; etc.

Another use of annotation may be the transcription of audio content. For instance, throughout the spoken text in a video message, there can be mention of items that are more efficiently and more effectively represented in written text. For example, if a sender wishes to include a URL, then the sender may copy and paste the URL as a form of annotation which is typically more efficient and user-friendly than including the same information in spoken form (for example, "(h)aitch tee tee pee colon slash slash double u double u double u dot . . . ").

Video Message Attachments and Introductions

Video messaging may include the capability to attach to, or include within a video message, video message structure, compound video message or any portion thereof, message content other than the primary video and/or audio message and also other than the video message structure for the purpose of creating a convenience for any potential user including providing an introduction capability or a particular perspective or other similar or related feature or capability concerning passive or active referencing of said attachment or inclusion. The convenience, reference, perspective or introduction, whether passive or active, may be created and/or executed automatically or manually or by some combination of these.

The convenience may be utilised in various ways, for instance, to create an introduction using video messaging and video message structure to another component of the message or a point therein or a part thereof (e.g., a document or portion or point within) or in similar manner to an attachment to the message or to a reference but non-included and non-attached portion of the message. Further, a plurality of such introductions of conveniences may be created, especially utilising the video message structure capabilities and also permitting manual and/or automatic navigation or access through or between or amongst these introductions or conveniences by a creator or by a viewer.

Second Embodiment

Figure 12A:
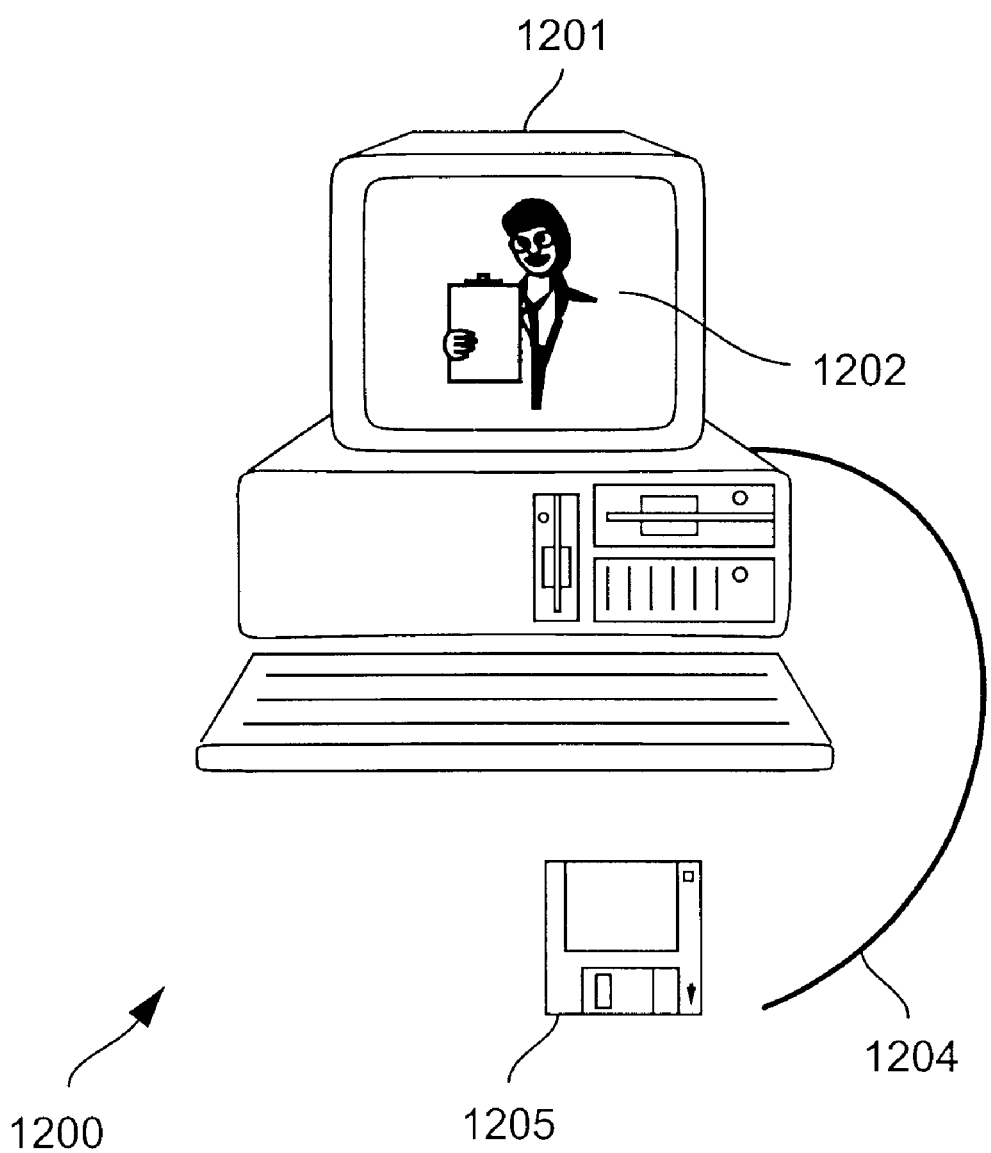
FIG. 12A is a drawing showing a receiving station in accordance with a second embodiment of the present invention.

Referring to FIG. 12A, there is illustrated a second preferred embodiment of the invention in which a receiver system 1200 provides viewing capability for video messages and a message structure editor. The receiver system 1200 can be described as a Receiving Station for video messages but this description does not imply a requirement that the station receive video messages, but rather provides a general description of the typical functionality and application of this embodiment.

The typical capability of the receiving station 1200 is to allow a recipient of a conventional linear (unstructured) video message to create or associate a structure of topics for a received conventional video message. Preferably, the structure of topics created or associated will correspond to the implied or inherent structure or content of the conventional linear video message. Once this structure of topics is associated with the conventional video message then additional capabilities will be available to the message recipient as described below.

The embodiment illustrated in FIG. 12A includes a video player 1202, typically associated with an audio player, both being shown within representative device 1201. The representative device is a general purpose computing device 1201 (e.g., a personal computer). Alternatively, it may be a dedicated or embedded device designed to support the functionality as described with reference to the present (second) embodiment. This embodiment includes a video and/or audio player substantially as described with reference to the first (preferred) embodiment for playing a video message received from a sender. The receiving station 1200 includes a communication link 1204 to a computer network for receiving the video message. Again, as described in the previous embodiment, an optional communication technique for video message can be effected by storing the message on a removable storage medium, such as a floppy disk 1205, to be sent to the recipient by conventional methods (e.g., post). The recipient can then insert the removable storage medium in a reader device (e.g., floppy disk drive) and access the video message and do with it as if it were received from the network. It is envisaged that the receiving station 1200 is preferably implemented on a portable computing system such a "Palm Top" or "Lap Top" having a modem device (not shown in FIG. 12) and a wireless connection to the computer network.

Figure 12B:
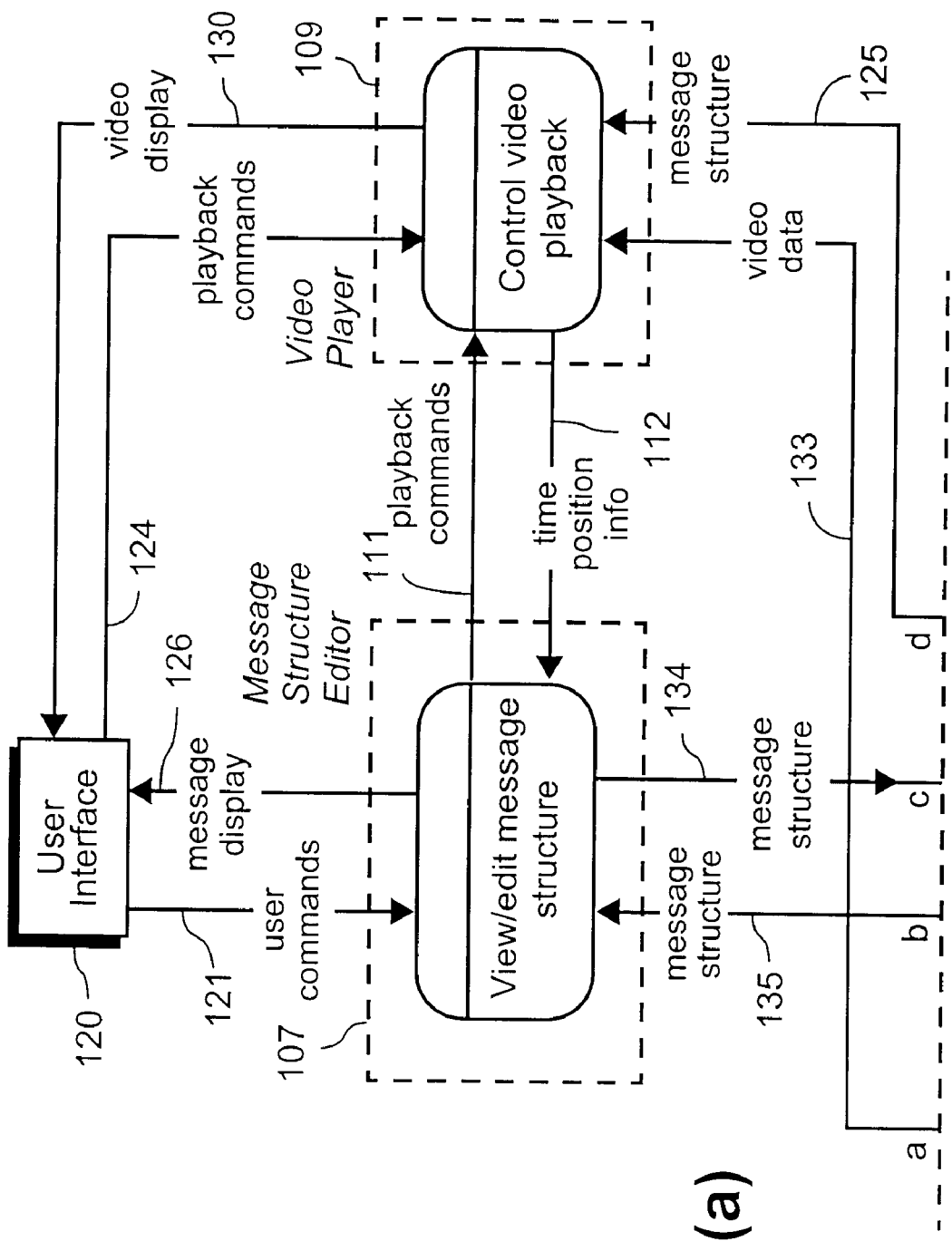
FIG. 12B is a block data flow diagram of the components of the receiving station of FIG. 12A in more detail.
Figure 12:
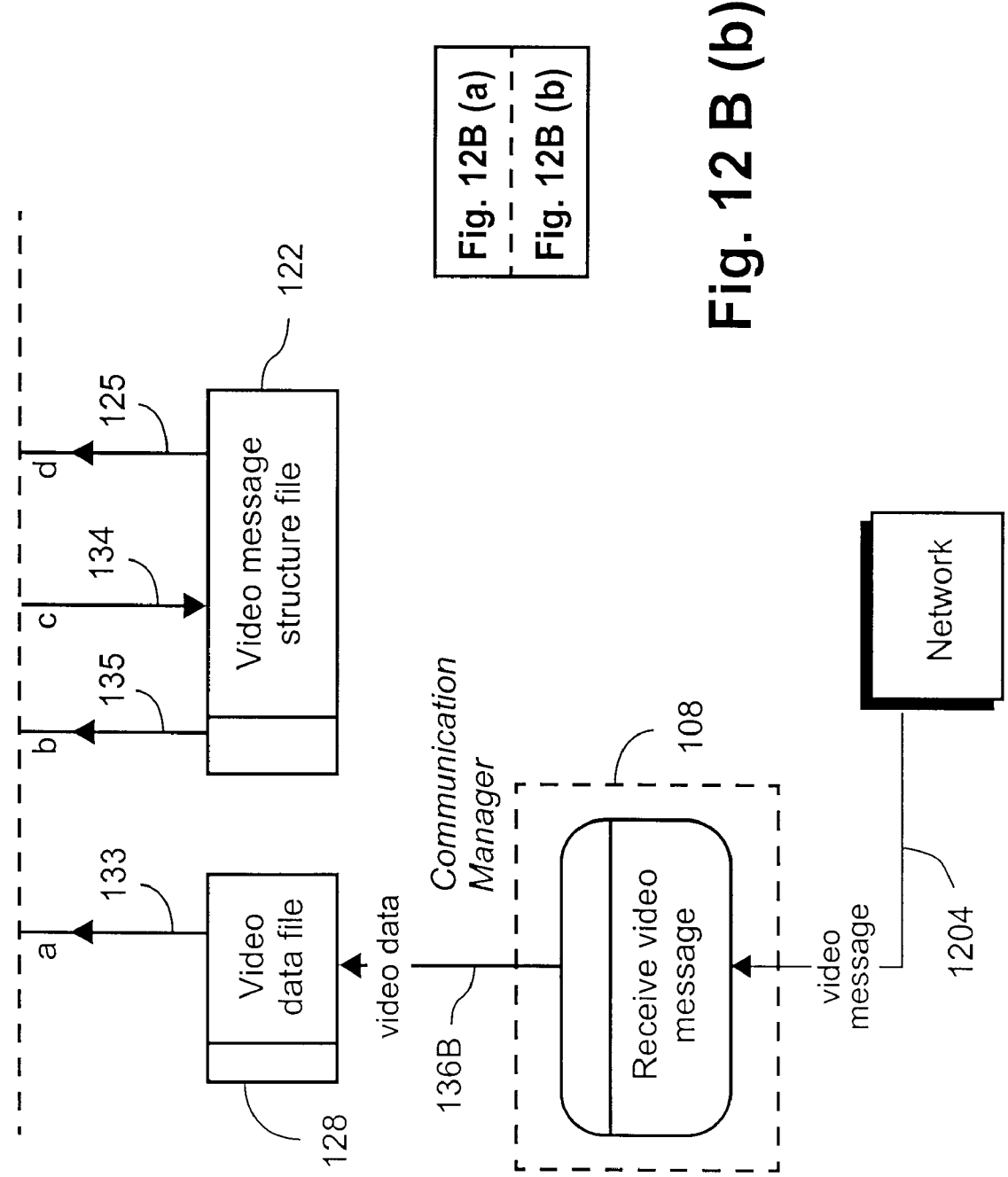

Referring now to FIG. 12B, there is shown a dataflow diagram performed during operation of the receiving station 1200 of the present embodiment. The description of FIG. 12B parallels substantially the description of FIG. 1C excepting that components, (modules) not essential to the second embodiment (i.e., the receiving station 1200) have been omitted from FIG. 12B. Additionally, FIG. 12 shows that video data is received 1204 from a network 1301 to the communication manager 108 and the communication manager stores (via video data line 136B) the received video data to a video data file 128. All corresponding components between FIG. 1C and FIG. 12B are as hereinbefore described with reference to FIG. 1C.

The message structure editor for the receiving station 1200 is substantially similar to the message structure editor for the sending station 100 excepting that it provides substantially those functions that pertain to manipulating a video message received from an external source (i.e., a sending station 100). Thus, the receiving station 1200 provides functionality for labelling, navigating, editing, and annotating a video message by utilising a structural representation of the message or intended message. As for the sending station 100 the video message structure, in the present embodiment, also represents the themes or subject matters of a video message as they appear sequentially in time and, when appropriate, as they are related from generic to specific in a hierarchical fashion. The video messaging (receiver) system allows recipients of video messages the following capabilities:

(i) Video message labelling;
(ii) Video message navigating;
(iii) Video message editing; and
(iv) Video message annotating;

This list of capabilities will be referred to in this document as "receiving station structured video message capabilities".

The receiving station structured video message capabilities can be used, for example, by a recipient to increase the number of useful functions applicable to a video message over those possible only when viewing a conventional, linear video message. The recipient may use the video message structure for navigation, labelling, and editing and other structured video message capabilities. Regardless of whether the video message structure was sent to the recipient or not, the recipient can make use of the structured video message capabilities, for example, creating their own message structure by labelling and then editing the video using this structure. A video message structure can be used for forms of automated processing of that message. For example, a video message structure can be used to provide an index for a video message that can later be used to facilitate searching for message content. For another example, a video message structure can be used as a basis for routing a video message to a specific person or role within an organisation (for example, as part of a call centre function).

The receiving station video message structure and the associated functionalities and capabilities will now be described in detail, however it should be noted that some of the capabilities and associated functionalities share some commonality to the list of some capabilities described with reference to the first embodiment of the present invention.

Video Message Labelling

Video message labelling allows a user to create nodes within the video message structure representing a video message and to create labels (textual or otherwise) for these nodes. These nodes are associated with specific points or sequences in the video message and the label can be used to describe or augment the video message content at that point or within that sequence. These labels can be used for subsequent navigation, editing, etc.

The operations available to a user include the capability that nodes, and hence labels, can be associated with a specific position or sequence within an existing video message. The means for a user to indicate the specific position or sequence within the video message includes the use of the current playing position of the video, user-marked in-points and out-points, and any other form of indication of video positions or sequences. Video message labelling can be made available to the recipient of a video message to facilitate these or other forms of processing.

Video Message Navigating

Video message navigating allows a user to cue to a position in the video message using the video message structure (for example, by clicking on a node in the video message structure, the playing of the video message could be cued to the corresponding position within the message).

During navigation, the display of the video message structure can be manipulated by a user, for example expanding a node to show a sub-tree or collapsing a node to hide a sub-tree.

The display of the video message structure can also be modified to provide feedback to the user with regard to the current position within the video. For example, the current position within the video can be indicated on the video message structure display by showing a Karaoke-style "bouncing ball", or the node corresponding to the current position within the video could be highlighted in some way.

In addition, when a video message is being played, the label from the node corresponding to the current position in the video can be displayed near the video display. This can, for example, take the appearance of a caption below the video, above the video, beside the video or overlaid on top of the video.

Video Message Editing

Video message editing allows the user to manipulate the video message structure in order to delete a sequence in a video message, move a sequence in the video message to another location within the message, extract a sequence from a video message to be used in another message or be used by another application.

The manipulating of the video message structure without altering the video message and manipulating the video message structure when the objective is to perform an analogous operation on the corresponding video message is substantially as hereinbefore described with reference to FIG. 6 to FIG. 11.

Video message editing can be made available to the recipient of a video message who benefits from being able to manipulate the message. The second embodiment allows the recipient to create a "customised" version of the message, enabling the recipient to comprehend, act on and use the message for other purposes.

Video Message Annotating, Video Message Attachments and Introductions

Video message annotating, video message attachments and introductions for a receiving station 1200 can be described in the same manner as that previously described, with reference to the corresponding section, for the first embodiment of the present invention.

Third Embodiment

Figure 13A:
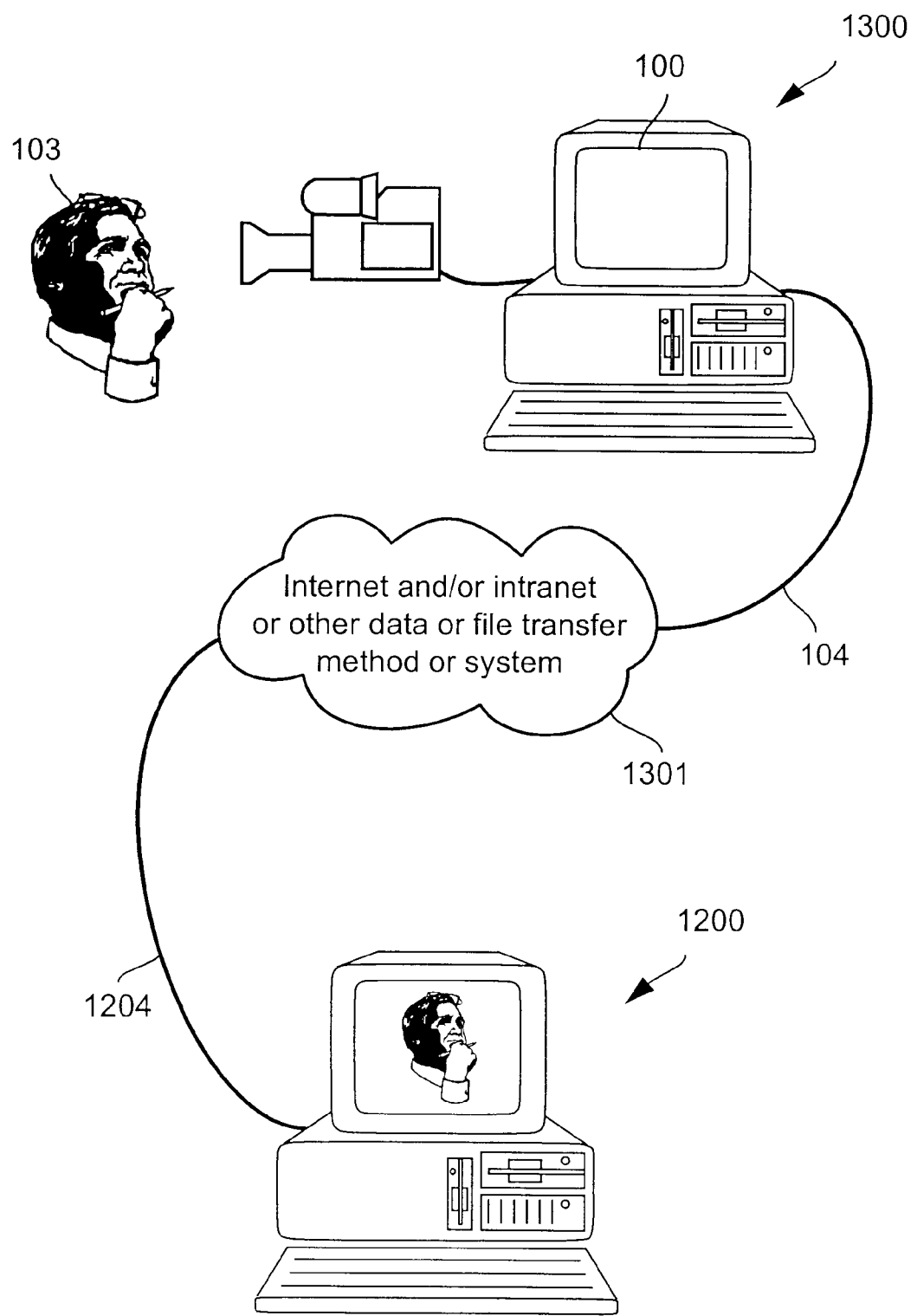
FIG. 13A is a drawing showing a video messaging communication system in accordance with a third embodiment of the present invention.

FIG. 13A illustrates a third embodiment of the invention in which the first and/or second embodiment further include a capability to send and/or receive an associated video message structure with a video message. The third embodiment is hereinafter referred to as a video message communication system 1300 and, whilst for clarity FIG. 13A shows a sending station 100 connected to a receiving station 1200 via a computer network 1301, it is envisaged that each "station" (i.e., sending and/or receiving station) on the network 1301 performs a dual function corresponding to both a sending station 100 and receiving station 1200. That is, preferably each user has the ability to both send and receive video messages and manipulate the messages in a manner described with reference to the sending station 100 or the receiving station 1200, respectively. Thus, in the preferred form of the present embodiment the first and second embodiment combine to provide capture capability for video messages, viewing capability for video messages, one or more message structure editors as well as the capability to send and/or receive an associated video message structure.

The video message communication system 1300, at the sender end, may be used to capture, create and send video messages and also send an associated or related video message structure along with the linear (unstructured) video message. The video message structure allows a recipient of the video message, having the capabilities to view the message as a receiving station 1200, to view a structured video message as intended by the sender. That is, the recipient can view and/or navigate through the video message using the video message structure sent to the recipient by the sender. Optionally, the video message communication system 1300, at the sender end can send the linear (unstructured) video message without an associated or related video message structure for the message in which case the video message communication system 1300 operates as sending stations 100 and/or receiving stations 1200, whether in combination or not, connected to a computer network 1301 as described with reference to the first and second embodiment.

Thus, the present (third) embodiment of the present invention advantageously provides a mechanism for communicating a desired video message structure in addition to the linear (unstructured) video message. Preferably, the desired video structure is a predetermined encoded representation that is separate from the linear (unstructured) video message itself. However, a video message structure itself, or parts there of, need not be sent by the sender to the recipient along with the linear (unstructured) video message; the sender may, for example, send a reference address (e.g., a Uniform Resource Locator URL) from where the video message structure can be obtained. The video message structure is separate from the linear (unstructured) video message so that the video message communication system 1300 of the present embodiment can communicate to a conventional (or unstructured) linear video messaging system by sending the linear (unstructured) video message without the associated video message structure. However, the video message communication system 1300 can also be implemented using a combined and inseparable video message and video message structure (also referred to hereinafter as a "combined video message") without departing from the scope and spirit of the invention. For example, an encoded representation can be used that encodes the message structure together (inseparably) with the video message.

The typical functionality and properties of the video message communication system 1300 allow enhanced capabilities for the sender of a video message and also for the recipient of a video message beyond those available or possible with conventional, linear video messaging systems.

FIG. 13A shows a computer network 1301 such as Internet (or Intranet) as a mode of communication between users of the video message communication system 1300, however other modes of data transfer can be used. For example, as described in the first embodiment a removable storage device can be used as mode of communication between users of the video message communication system 1300. In addition, it is not a requirement of the present embodiment that the linear video message be sent to a recipient via the same mode of communication as that used to transmit an associated video message structure. Further, there is no restriction on the number of interconnected component sub-systems (stations whether sending 100 or receiving 1200 or stations combining functionality of both sending and receiving stations) that can be included as part of the video message communication system 1300.

Figure 13B:
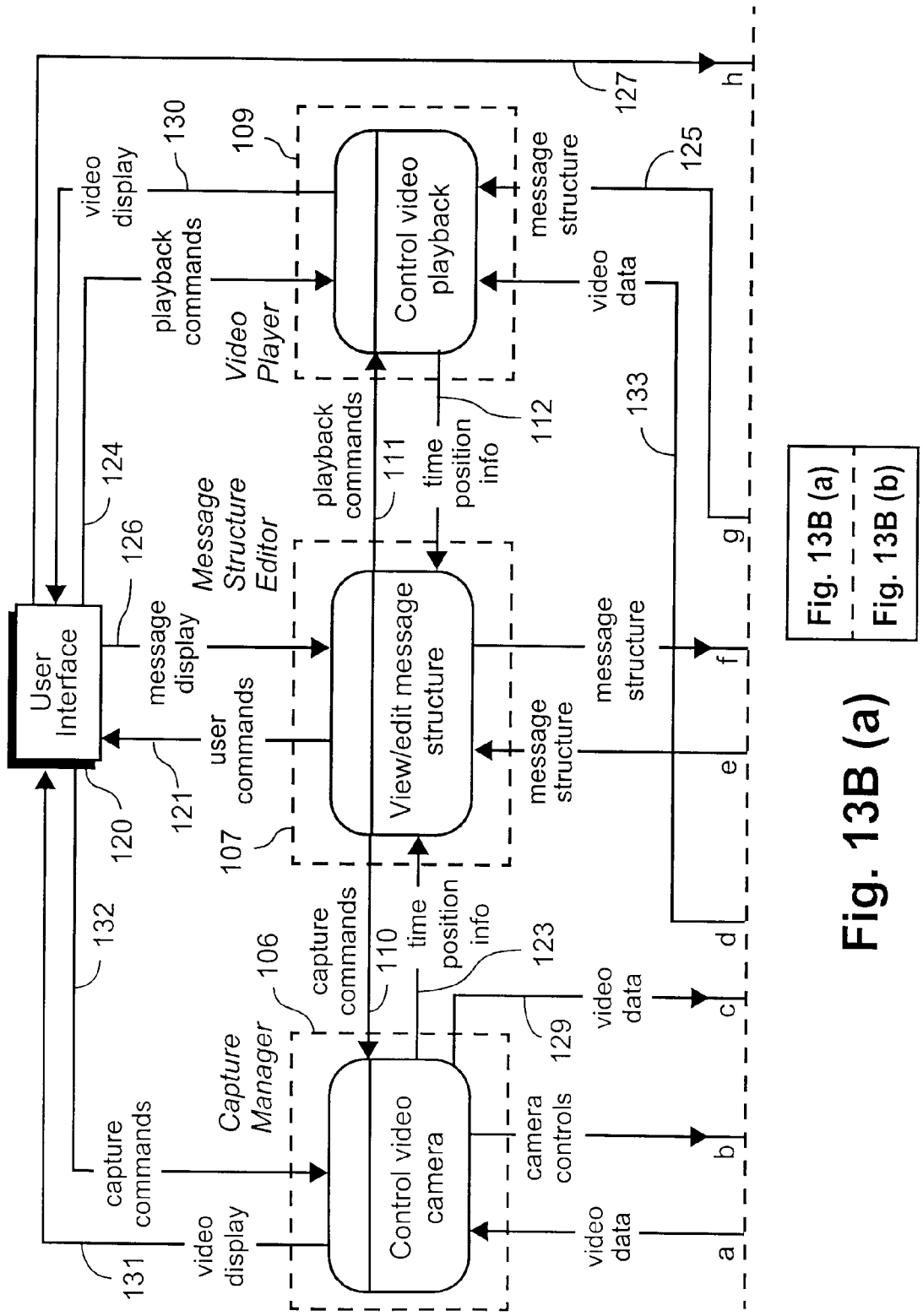
FIG. 13B is a block data flow diagram of the components of the video messaging communication system of FIG. 13A in more detail.
Figure 13B:
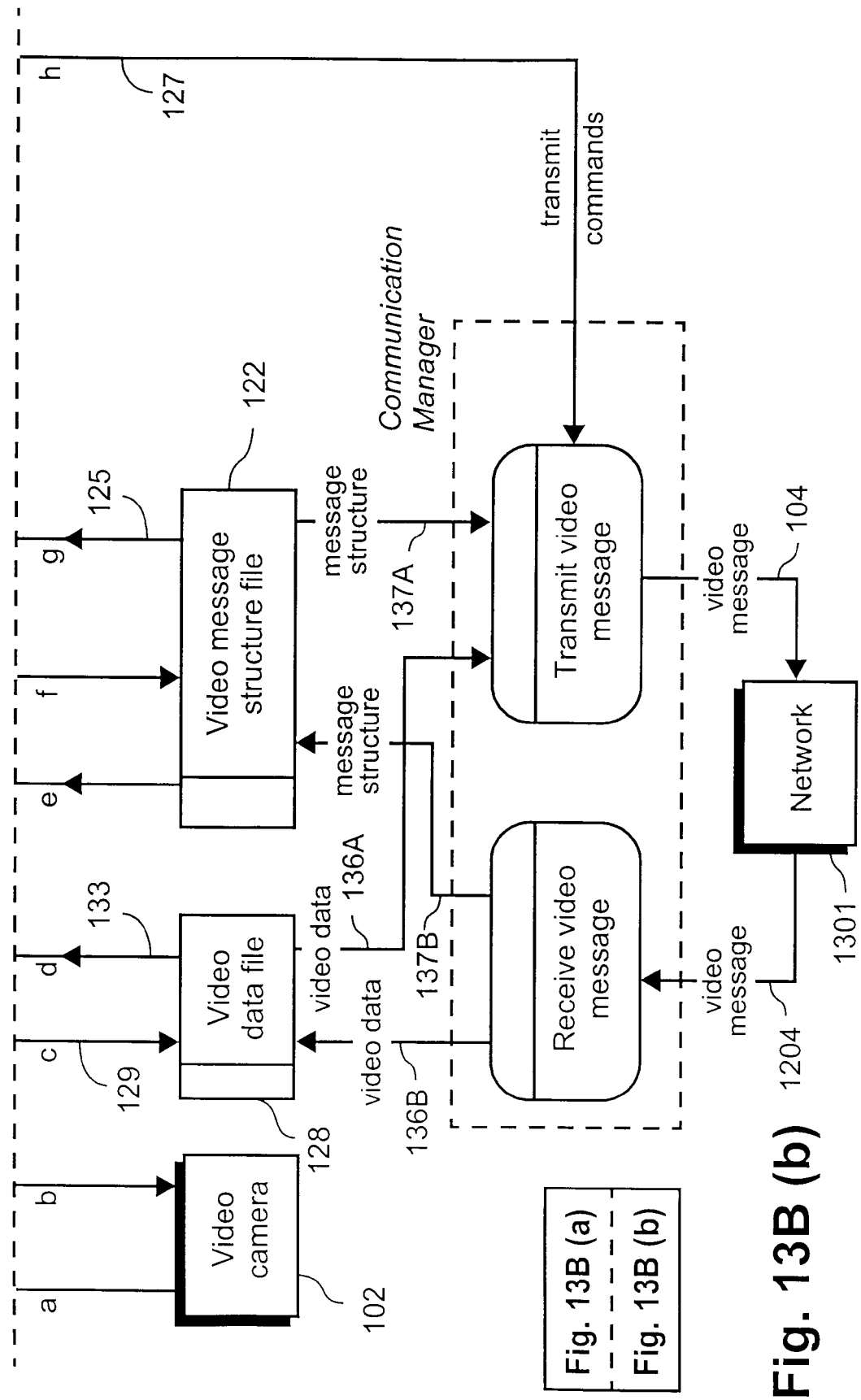

Referring now to FIG. 13B, there is shown a dataflow diagram for operation performed by the video message communication system 1300 of the present (third) embodiment. The description of FIG. 13B parallels substantially the description of FIG. 1C combined with the description of FIG. 12B, and therefore FIG. 13B includes all the components (modules) of both FIG. 1C and FIG. 12B. In addition, FIG. 13B shows that a video message structure according to the present embodiment can be communicated via connection line 137A to the communication manager 108 which in turn transmits an associated video message structure along with the video data to a computer network 1301 (i.e., transmit video message). The transmission of the video message structure typically occurs when video message communication system 1300 is in sending mode or acting as a sending station. That is, a sender is to send a video message. At a receiving end of the video message communication system 1300, if both video data and the associated video message structure is received, the communication manager 108 separates the video message into the data and structure and stores the video data (via a video data bus/line 136B) into the video data file 128 and the video message structure (via a video structure bus/line 137B) into the video message structure file 122, respectively. Alternatively, the receiving station end of the video message communication system 1300 may receive just the video data (i.e., the video message without the associated structure), in which case the communication manager 108 directs 136B the data to the video data file 128 for storage and the recipient may then manipulate and/or view the video data as described with reference to the second embodiment of the present invention.

All components of FIG. 13B in common (i.e., having the same reference numeral) to FIG. 1C and/or FIG. 12B have substantially the same description attributed to them as hereinbefore described with reference to FIG. 1C and/or FIG. 12B.

The third preferred embodiment includes one or more of the capabilities and/or properties listed and described with reference to the first and second preferred embodiment. As previously noted, in practise, it is desirable that each user, of the video message communication system 1300, have the capability to perform a dual function as sending and receiving station, and thus all the capabilities available to the sending station 100 and the receiving station 1200, without duplication of capabilities in common to both, are desirable. Explicitly, a desirable list of capabilities for the video message communication system 1300 include:

Video message planning;

Video message capturing;

Video message labelling;

Video message navigating;

Video message editing; and

Video message annotating.

The list representing a union of the set referred to as the sending station structured video message capabilities and the set referred to as the receiving station structured video message capabilities.

The video message communication system 1300 comprises transmission and reception capability for a video message, a video message structure or a compound video message preferably in any one or more of the following forms:

Transmission and reception of a conventional linear video message without any explicitly or implicitly referenced video message structure. This case may typically resolve to one or more instances of the first and/or second preferred embodiment(s).

Transmission and reception of a conventional linear video message with an accompanying or separately transmitted and/or received video message structure whether or not either the video message or video message structure is explicitly or implicitly (by reference or alike) included. The video message structure can be partially or incrementally sourced from a third party, machine or location (typically by some implicit or explicit reference).

Transmission and reception of a video message structure without any explicitly or implicitly referenced video message.

Fourth Embodiment

A fourth embodiment of the invention is described substantially as the first embodiment excepting that no communication is sent to a recipient. FIG. 14 therefore shows a drawing substantially similar to FIG. 1A excepting no network communication line or connection is shown. That is, the video message is captured in the same manner as that described with reference to the first embodiment, but rather than send the message to another user the message (and/or associated video message structure) is stored on a local storage device (e.g., hard disk drive) for personal use. For example, this system may be used for generating a memorandum for personal use or future reference. Whilst storage of the video message and/or video message structure on a local storage device is preferred, the present embodiment can operate by storing the video message (and/or video message structure) at a remote location on a computer network server for retrieval at a later date. Whilst storing the video message at a remote location may include sending of the video message, the message is not intended for use by another user (recipient) as is the case in the first embodiment.

Fifth Embodiment

The fifth embodiment is described substantially as the first embodiment, the second embodiment, the third embodiment or the fourth embodiment of the present invention with at least one additional feature. This additional feature is the addition or application of video message templates to any one of the previous embodiments or parts thereof. The video message template is used, amongst other uses described hereinafter, to generate the video message structure and is interchangeably referred to hereinafter instantiating the video message template. In the present (fifth) embodiment, where in the previous embodiment(s) the video message structure was transmitted from sender to receiver, rather than send the video message structure (i.e., an instantiation of the video message template) to a recipient, the video message template itself is sent along with the linear video data. Thus, the recipient can therefore instantiate the template to provide a substantially similar video message structure as that used by an originator of the video message. Optionally, recipient can use the received template to generate a customised video message structure thereby customising the message to the recipient's user preference whilst still receiving (viewing) substantially the same message. For example, the user preferences may include customising a "look and feel" of the output interface (display). A further example may include customising a video message structure to provide a minor rearrangement of the structure so that a "summary section" of a video message is presented before a "main section" should a recipient desire so even though it may not be the same order the origintor had contemplated.

Alternatively, a video message template can be stored at a predetermined location, such as a server on a computer network, having a reference location address (e.g., uniform resource locator, URL) and transmit to a recipient of a video message the linear video data along with the reference location address without departing from the scope and spirit of the invention.

Typically, a template in a computational or equivalent system such as a computer system can be defined as:
- a pre-defined structure available for re-use, or
- a grammar for a class of such structures, the grammar dictating the rules for well formed instances of this class.

The template definition described above should in no way be taken as limiting on the present invention, and is merely an exemplary definition of desirable features of a template. For example a template can be generated for a single use and then discarded. Additionally, a template may include rules governing message intent, message structure and/or message attributes (attributes include duration of video clip, font type and size for text labels, and parameters for adjusting colour and general appearance of a GUI. application, etc.).

Preferably, a template is a repository of experiences as to best practice ("best" including any one or more of the following: most economical, most efficient, most effective, etc. depending on the context). The best practise is encoded into a template and reflects the practise of an experienced sender of messages. Thus, for example, most effective may reflect a most effective way of creating, sending or receiving a memorandum so as to get the message being communicated across in an effective manner. This can be performed by a template guiding the user to produce a memorandum using the skills of an experienced person while the user may be quite inexperienced at memo writing. Thus, in this context, a desirable feature of a template its re-useability, either by its creator or by another user(s).

Table 1 matches a purposes of a (video) message structure and of templates for each one of a plurality of major classes of functionalities of video messaging systems.

TABLE 1

| Video Messaging System functionalities | Purpose of message structure in video messaging systems without templates | Purpose of template as different from message structure | Part of template used | Necessity of links between message structure and message content |
|---|---|---|---|---|
| Planning a message | Note-jotting for completion, coherence | Guidance as to best practice | Structure, other attributes | No |
| Creation of a message | Note-jotting for completion, coherence | Guidance as to best practice | Structure, other attributes | No |
| Editing of a message by sender | View on message, direct access to message content | Prompting or guiding sender as to optimal structure, order, etc. | Intent, structure, other attributes | Yes |
| Navigation within a message by sender | View on message, direct access to message content | Prompted or automated navigation based on template intent, etc. | Intent, structure, other attributes | Yes |
| Viewing of a message by recipient | View on message | Guidance as to what sender considers best practice OR Guidance as to the interpretation of the message OR Efficient processing of message content | Intent, structure, other attributes OR Intent, other attributes OR Structure | Yes |
| Editing and Filtering of a message by recipient | View on message | Guidance as to what sender considers best practice | Intent, structure, other attributes | Yes |
| Navigation within a message by recipient | View on message | Efficient processing of message content | Structure | Yes |
| Message management functions: storing, accessing, retrieving a message | Meta-data | Meta-data | Intent | Yes |
| Annotation of a message | View on message | Prompting or guiding user as to optimal annotation method, annotation point(s), etc. | | Yes |

Video Messaging System functionalities: this column of table 1 lists the various functionalities available to a sending station 100, a receiving station 1200 and/or a video message system 1300.

Purpose of message structure in video messaging systems without templates: this column of table 1 indicates the purpose of a video message structure in video messaging systems without templates. For example, in viewing the message by the recipient (row 5 of table 1) the structure is used to "view on message" (row 5, column 2 of table 1) that is to allow the user to access the message at different points on the structure.

Purpose of template as different from message structure: this column of table 1 indicates the purpose of the template as different from the video message structure: For example, in viewing the message by the recipient (row 5 of table 1) a template can provide guidance as to what the sender considers best practice, guidance as to the interpretation of the message and/or efficient processing of message content.

Part of template used: this column of table 1 indicates what part of the template is used. That is, a message template can be multi-functional and provide different features. For example, in viewing the message by the recipient (row 5 of table 1) a template can provide: message intent (e.g., propose a meeting), structure, other attributes such as "tone of message" (e.g., friendly, authoritative, etc.).

Neccessity of links between message structure and message content: this column of table 1 indicates whether or not a link or links exist between the message content and the video message structure.

Thus, table 1 shows that the main contributions of templates as distinct from structure include:

The provision of guidance. Capture or creation of a video message may be a potentially intimidating technology for the sender. To address this, templates can act, for the sender, as a guiding repository of "best practices".

The use of message intent as meta-data for message management functions.

From the framework provided by the present embodiment, it is desirable that video message templates include the following template functional types:

A template may provide a default video message structure of a message. The template provides a typical message structure, which is presented to the sender and which the sender "fills out" or applies to a specific message at capture time. Under this meaning, the user would choose a template from a set, and would then record the message following the structure suggested by the template. Preferably, the template's purpose in this context is guidance. If the structure of the template is linked to the message contents, then the template can also be used for message management functions.

A template may provide a default video message structure with associated default message attributes. Here, the user would choose a template from a set and this would bring up an appropriate message structure and attribute set. The user would then record the message following the structure and attribute values suggested by the template. As in the previous case above, the template's purpose here, without restriction, is guidance but it may also be useful for message management functions, if the appropriate links are created.

A template may provide either of the above-described functionality with the added restriction that its structure and attribute functions may be, in part or whole, unchangeable. Here, a template is analogous to a set message form, whose content is video rather than text. This is useful in cases where the recipient of the message needs to process the message in predetermined ways, such as the example of call centres. The template's purpose here, without restriction, includes: guidance and facilitating the processing of the message. Message management functions can also be performed in this case, structure and content being linked.

In the first two bullet points above, a desired purpose of the template's purpose is to provide guidance to a user, and resulting messages may thus have different video message structures (and, optionally different attributes for the second of the first two bullet points above) although produced with the aid of the same template. Optionally, these structures could, in turn, be used to define new templates.

Templates for the Sender

An example of control flow for user creation, navigation and/or editing is now described with reference to FIG. 15.

Initially, during the message planning step, the sender chooses 1501 a template from a set. The template includes relevant information which can be included in a video message and details of one of a predetermined set of most appropriate message structures and attributes of the video message. Next 1502 the video message communication system 1300 prompts the user with the selected template according to whether the user is performing a video capture, navigation through an existing video message or data, and/or editing a current video structure. For example, during execution of the video message capture, the chosen template and attributes provide a guide (or prompt) to a user (a sender). Preferably, the template further maintains a flow of information, by prompting the sender (e.g., much like slides in a seminar) to the next course of action. No links are necessary between a video message structure (i.e., an instantiation of the template) and video message content at this stage, but these links can be beneficial to the user (sender) as message management functions. As previously described, the video message content and video message structure linking can be done using timestamps or other references into a captured piece of video, and may be performed either during the recording of the video message, or afterwards. For example, while recording a video message, a sender may execute a template, using an input device such as a mouse (clicking on the part that is being recorded) or a keyboard (arrow keys). At step 1502 the template is instantiated to provide a video message structure associated (linked) to a captured video message data.

Figure 15:
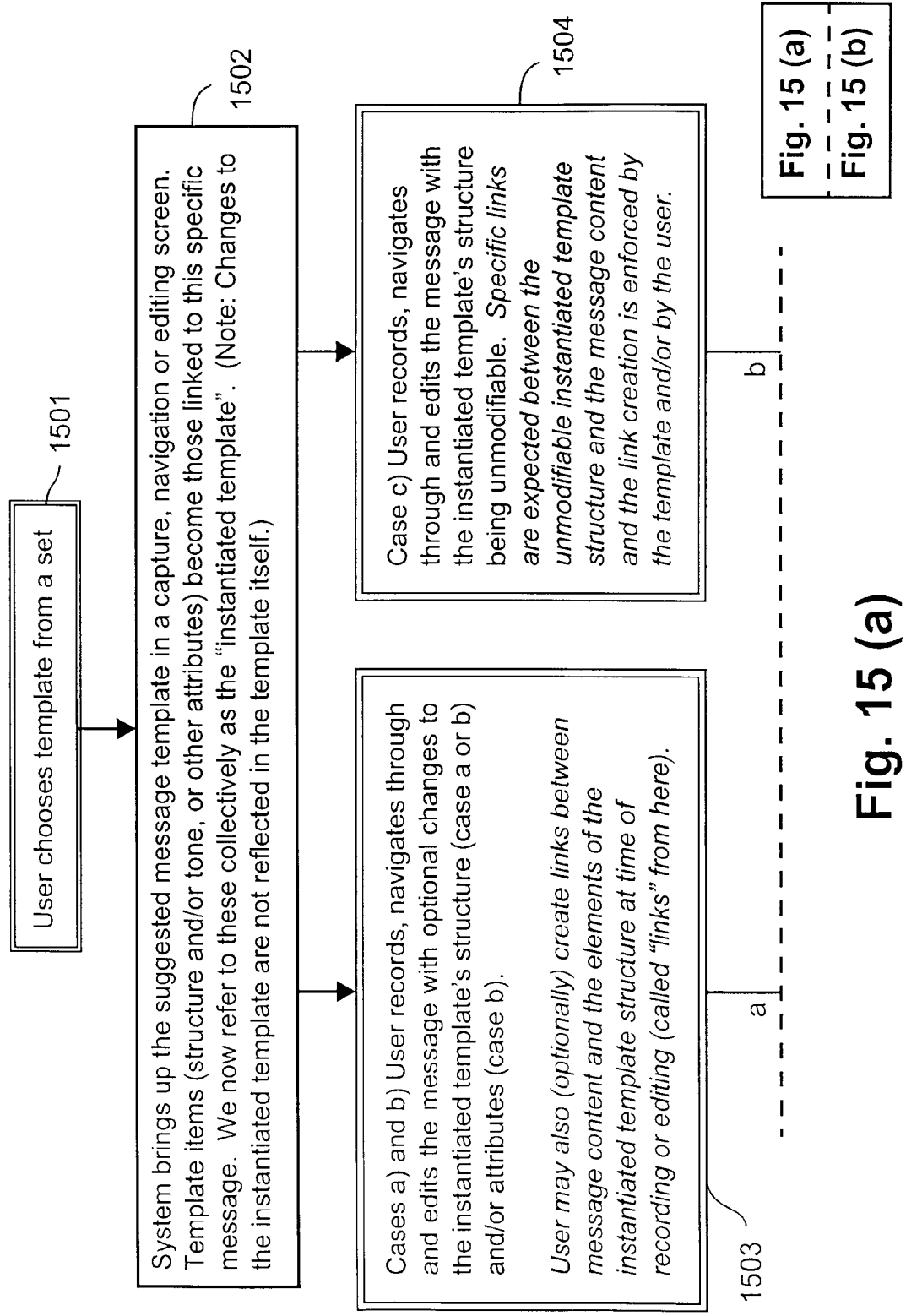
FIG. 15 is a flow control diagram for an example of video message templates in accordance with a fifth embodiment of the present invention.
Figure 15:
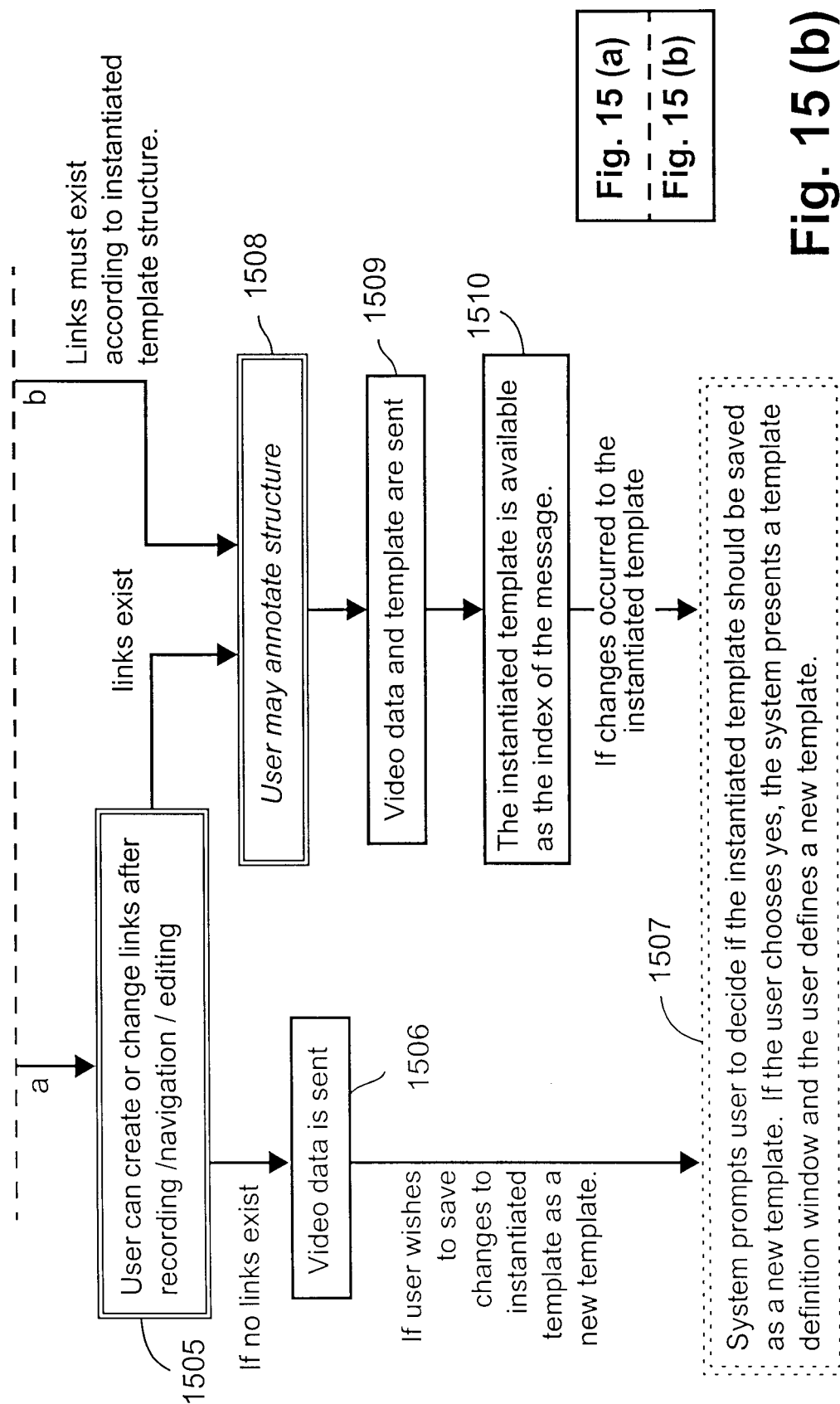

Next in the steps of the flow control of FIG. 15, the user is given one of two options according to the previously described functional types of the selected template (step 1501).

The two options include:

Option 1, step 1503, the type of selected template allows the video message structure resulting from the template (ie. instantiated template) to be modified and the user can:
 a) change the video message structure itself; and/or
 b) change attributes; or Option 2, step 1504, the selected template is of functional type "unchangeable" and therefore part or all of the instantiated template cannot be changed (modified) by the user (typically a sender).

Option 2 is advantageous, for instance, where it is desirable that the video message structure used by a sender (originator of a video message) be substantially the same as the instantiated template (i.e., video message structure) used by a recipient of a video message.

In step 1503, links are created between nodes of a video message structure and video data segment, preferably at time of capture of the video data or at editing a video message. In option 1, step 1503, a user is free to create further links or remove as many links as desired in creating or editing a video message. Thus, a next step 1505 allows the user to create new links or change existing links between video data and associated video message structure. One of two paths in the flow control is taken depending on whether or not links exist between the video message structure and the video data. If no links exist, a first path is taken and the video data is sent 1506 and the flow control follows to a further step 1507, where the user is prompted to decide whether a current instantiation of the template is to be saved as a new template. To which, if the user responds with "yes", a new template is stored, otherwise no new template is saved.

At step 1505, if at least one link does exist between the video message structure and the video data, a second path is taken in the flow control to step 1508, where the user is given the option to annotate the video message structure. Next, 1509 the video data and template(s) is (are) sent to and received by a recipient as a video message. The recipient can instantiate the received template(s) and use the resulting video message structure as an index into the video data of the video message. A copy of the video message is preferably retained by the originator (sender), who can also use the instantiated message template as an index into the video data of the video message (step 1510). The flow control is, now, directed to step 1507, and if any changes to the video structure were made in step 1505, then the user is given the option to save the instantiated template, as a new template as previously described with reference to step 1507.

If option 2, step 1504, is taken following step 1502, that is the selected template does not allow modification to part or all of an instantiated template, links are created, either by the selected template or by requiring a user to create necessary links as governed by the selected template, between predetermined nodes of the instantiated template and one or more segments of the video data. Links between predetermined nodes of a current instantiation of the video message template and segments of an associated video data must now exist as required by the selected template. Thus, the flow control is directed through steps 1508 to 1510 and step 1507 as previously described with reference to these steps.

Note that for navigation and editing, the three, previously-described template functional types may bring no additional functionality or benefit other than those already covered by the provision of message structure, however, by extending templates to include some form or forms of interactivity a user can have, for the navigation and editing user tasks, additional functions including user-prompting, automatic or semi-automatic enhancements and efficiency improvements, auto-correction, user-anticipation and other facilities.

Further, the sender preferably is given the capability or option to change some or all of the various template parameters or attributes. There is therefore a distinction between the template itself and its instantiated structure and a modification to each differs as follows: a modification to a template will invoke the same modification in a subsequently-instantiated structure or structures; whereas a modification to a structure will have no impact on any template that it might have been instantiated from and therefore will have no effect on any further structure that might be instantiated from the modified template. Changes to an instantiated structure may or may not be reflected as a template modification or as a new template.

Table 2 matches a purpose of a (video) message structure and of templates for each one of a plurality of major classes of functionalities of video messaging systems for the sender (a subset of table 1).

TABLE 2

| Video Messaging System functionalities | Purpose of message structure in video messaging systems without templates | Purpose of template as different from message structure | Part of template used | Necessity of links between message structure and message content |
|---|---|---|---|---|
| Planning a message | Note-jotting for completion, coherence | Guidance as to best practice | Structure, other attributes | No |
| Creation of a message | Note-jotting for completion, coherence | Guidance as to best practice | Structure, other attributes | No |
| Editing of a message by sender | View on message, direct access to message content | Prompting or guiding sender as to optimal structure, order, etc. | Intent, structure, other attributes | Yes |
| Navigation within a message by sender | View on message, direct access to message content | Prompted or automated navigation based on template intent, etc. | Intent, structure, other attributes | Yes |
| Viewing of a message by sender | View on message | Efficient processing of message content | Structure | Yes |
| Message management functions: storing, accessing, retrieving a message | Meta-data | Meta-data | Intent | Yes |
| Annotation of a | View on | Prompting or | | Yes |

TABLE 2-continued

| Video Messaging System functionalities | Purpose of message structure in video messaging systems without templates | Purpose of template as different from message structure | Part of template used | Necessity of links between message structure and message content |
|---|---|---|---|---|
| message | message | guiding user as to optimal annotation method, annotation point(s), etc. | | |

Templates for the Recipient

The video messaging communication system 1300 (or receiving station 1200) would allow the recipient to receive, accompanying or referenced within a message, a video messaging template which was used to construct the video message or portion thereof.

For the recipient, the template acts as a support mechanism during three stages, the first two of which—planning and creation—are very similar to those described in the previous section "template for the sender", with the exception that the sending station creates a link from a template to a corresponding section of the video message. During the viewing stage, the template preferably provides the recipient with any or all of the following key advantages:

- Provide a more coherent flow of information, by including, providing and/or accessing placeholders in the message which act as a guide to the message. Preferably, an advantage of the recipient is the ability to see the structure of the content of the entire message, its explicit intent, attributes, etc. This may allow the recipient to:
  - Form a global view of the message, which is particularly beneficial in the case of a video-based communication medium.
  - Reduce the risk of misinterpreting the message, due to the explicit message intent and dialogue function.
- Provide advantages to the recipient that were already described as available from video message structures that are also available from video message templates, potentially including additional capabilities:
  - Editing of messages, possibly filtering out some of message sections and re-sending others as part of other messages. The benefits of the template here include ensuring that the constraints for the original message are respected in the edited version as well as potentially providing context information, etc that may not be obvious from a video message structure alone.
  - Navigating through a message(s). For example, this will allow the recipient to skip to a particular part of the message that the recipient finds most useful or interesting.
  - Extracting of particular section(s) of relevance from message(s), and potentially using it or them in a reply or replies to the sender or senders or in other message(s).
- The capability to augment and modify one or more templates. For example, a recipient who is a new user of a video messaging system may adopt a sender's template for organising a meeting, and subsequently modify that template. The template may act as a "best practice" repository.
- The potential for integrating workgroup functions, where a set of people needs to share templates for a set of specific tasks. Again, the template may act as a "best practice" repository, and enabling the uniform processing of messages.
- The reception of the template by the recipient can enable the efficient processing of message content in cases when this processing requires explicit action from the recipient. Here, the template is considered as a type of "form" which the sender must follow. Therefore, in the present (fifth) embodiment the template's role is then to ensure that the recipient knows a priori what information will be sent and how that information is structured, where to look for specific information, etc. The recipient can thus anticipate efficient ways to handle the message.

Referring to Table 3 there are shown purposes of a (video) message structure and of templates for each one of a plurality of major classes of functionalities of video messaging systems for the sender (a subset of table 1).

TABLE 3

| Video Messaging System functionalities | Purpose of message structure in video messaging templates | Purpose of template as different from message structure | Part of template used | Necessity of links between message structure and message content |
|---|---|---|---|---|
| Viewing of a message by recipient | View on message | Guidance as to what sender considers best practice OR Guidance as to the interpretation of the message | Intent, structure, other attributes OR Intent, other attributes OR Structure | Yes |

TABLE 3-continued

| Video Messaging System functionalities | Purpose of message structure in video messaging templates | Purpose of template as different from message structure | Part of template used | Necessity of links between message structure and message content |
|---|---|---|---|---|
| | | OR Efficient processing of message content | | |
| Editing and Filtering of a message by recipient | View on message | Guidance as to what sender considers best practice | Intent, structure, other attributes | Yes |
| Navigation within a message by recipient | View on message | Efficient processing of message content | Structure | Yes |
| Message management functions: storing, accessing, retrieving a message | Meta-data | Meta-data | Intent | Yes |
| Annotation of a message | View on message | Prompting or guiding user as to optimal annotation method, annotation point(s), etc. | | Yes |

Templates for Message Management

While templates typically do not specify information about the exact content of a video message, they do provide some information about the content, especially regarding the type of the message. In particular, the message intent (e.g., propose meeting, seminar announcement, etc.) of the template used to produce a message is indicative of the type of information that is contained in the video message. The message intent is a template element that is likely to be useful for indexing purposes. Exploitation of the message intent allows searches such as, for example "find the messages about seminar announcements". Searches might be undertaken addressing other attributes of a template, possibly including combinations of attributes.

The message intent, or template intent, can thus serve as meta-data to a derived video message or compound video message, in addition to other data such as the date and the recipients. Like any meta-data, the message intent or template intent can therefore be used as an index to help in searching for and retrieving a specific message.

A message may include several "fields": An address field, where the address of the recipient is entered to send the video message; a subject field where a brief description of the subject matter of the message is inserted, if desired; a carbon copy field is used to send copies to other recipients; an attach message field which includes a reference to other documents or video messages; and a date/time field for storing the date and/or time the message was sent by the sender. Those skilled in the art will recognise that other fields can be included without departing from the scope and spirit of the invention. For example, another field can be a priority field indicating a degree of urgency of the video message.

To search, for example, messages about seminar announcements: the subject field of an email message (whether video or text-based) could be any one or more of the following:

<Name>seminar ...
Date: Dr. XX on "topic"
A talk on "topic" by Dr XX
Mark your calendar: Date A search for "seminar announcements" might retrieve a message with the subject such as the first one given above, but will not be able to recognise the other messages as seminar announcements based on the Subject field. On the other hand, if the messages were created with a "seminar announcement" template, they would all be readily found. It is envisaged that the reliability of this template intent for searching purposes depends on the usage the sender made of the template. In a situation in which the template structure cannot be changed nor edited, the template intent can reliably be used for indexing.

Video Message Transmission

In this embodiment it will be typical that a created video message may be transmitted and received by a variety of tech that may also include or imply a message structure or message template or parts thereof or references, etc as indicated by these examples:

Video message including sender's video message template which may be used to instantiate a video message structure at the receiver;

Video message including sender's instantiated video message structure or reference or implication to said video message structure (both as described in the third preferred embodiment);

Video message including a reference or implication or equivalent to, but not explicitly including, the sender's video message template;

Video message including a portion or modification or incremental change to sender's video message template, the latter being referenced or implied but not explicitly included.

Preferred Embodiment of Apparatuses

Figure 16:
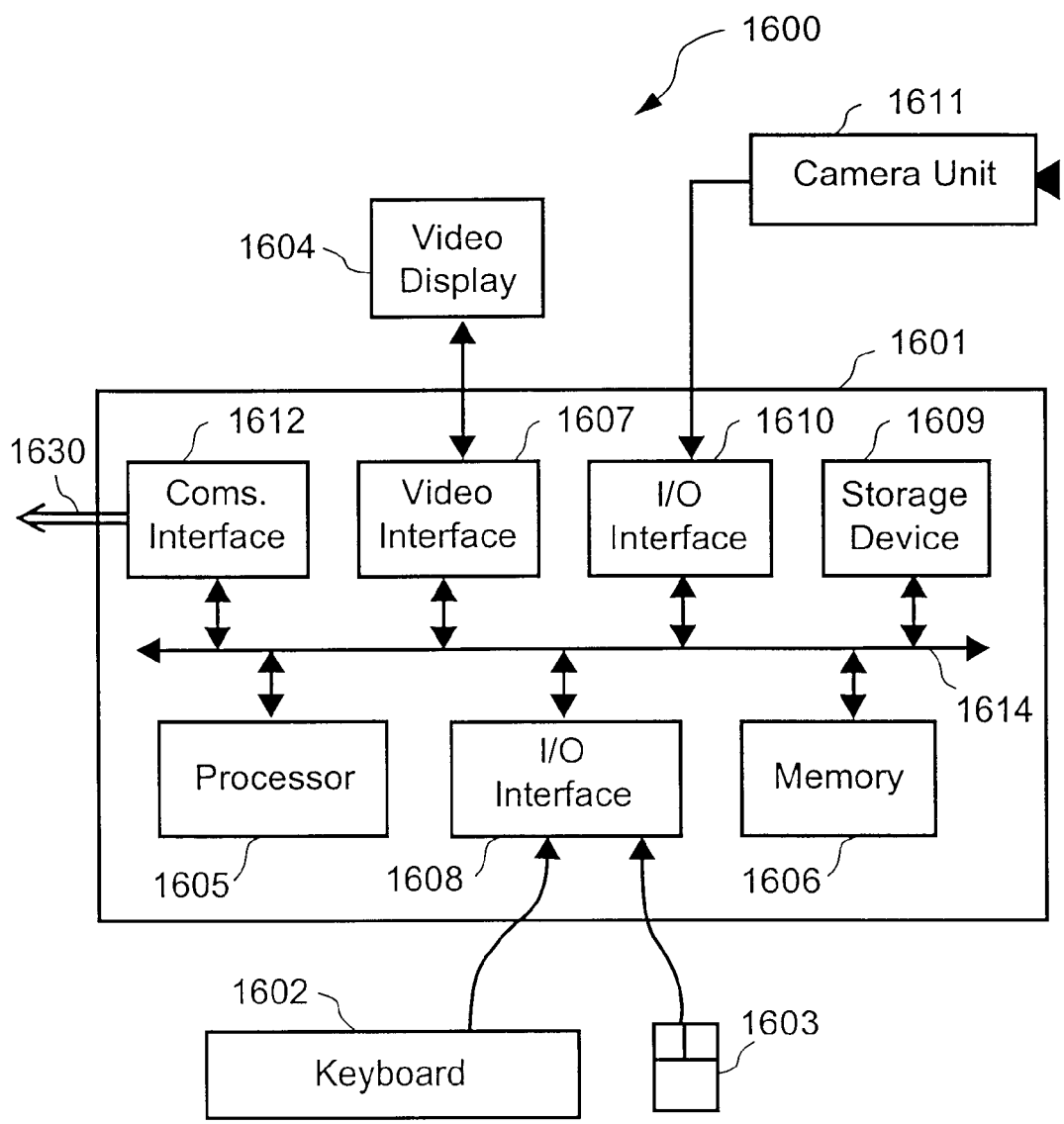
FIG. 16 is a diagram showing a general purpose computer upon which the embodiments of the present invention can be implemented.

The embodiment(s) of the video messaging system (sending station 100, receiving station 1200 and/or video message communication system 1300) are preferably practiced using a conventional general-purpose computer, such as the one shown in FIG. 16, wherein the video messaging system can be implemented as software executing on the computer. The software can be divided into two separate parts; one part for carrying out the operations of the system; and another part to manage the user interface between the latter and the user. The software can be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for video messaging system in accordance with the embodiments of the invention.

The computer system 1600 comprises of the computer 1601, a video display 1614, and input devices 1602, 1603 and 1611. In addition, the computer system 1600 can have any of a number of other output devices including line printers, laser printers, plotters, and other reproduction devices connected to the computer 1601. The computer system 1600 can be connected to one or more other computers via a communication interface 1612 using an appropriate communication channel 1630 such as a modem communications path, a computer network, or the like. The computer network preferably includes a local area network (LAN), a wide area network (WAN), an Intranet, and/or the Internet.

The computer 1601 itself comprises a central processing unit(s) (simply referred to as a processor hereinafter) 1605, a memory 1606 which can include random access memory (RAM) and read-only memory (ROM), input/output (IO) interfaces 1608 and 1610, a video interface 1607, and one or more storage devices generally represented by a block 1609 in FIG. 16. The storage device(s) 1609 can include one or more of the following: a floppy disc, a hard disc drive, a magneto-optical disc drive, CD-ROM, magnetic tape or any other of a number of non-volatile storage devices well known to those skilled in the art. Each of the components 1605 to 1610 and 1612 is typically connected to one or more of the other devices via a bus 1614 that in turn can include data, address, and control buses.

The video interface 1607 is connected to the video display 1604 and provides video signals from the computer 1601 for display on the video display 1604. User input to operate the computer 1601 can be provided by one or more input devices. For example, an operator can use the keyboard 1602 and/or a pointing device such as the mouse 1603 to provide input to the computer 1601. Additionally, input, such as video, can be effected via a video camera 1611 and corresponding input interface circuitry 1610.

The system 1600 is simply provided for illustrative purposes and other configurations can be employed without departing from the scope and spirit of the invention. Exemplary computers on which the embodiment can be practiced include IBM-PC/ATs or compatibles, one of the Macintosh™ family of PCs, Sun Sparcstation™, or the like. The foregoing are merely exemplary of the types of computers with which the embodiments of the invention can be practiced. Typically, the processes of the embodiments, described hereinafter, are resident as software or a program recorded on a hard disk drive (generally depicted as block 1609 in FIG. 16) as the computer readable medium, and read and controlled using the processor 1605. Intermediate storage of the program and pixel data and any data fetched from the network can be accomplished using the semiconductor memory 1606, possibly in concert with the hard disk drive 1609.

In some instances, the program can be supplied to the user encoded on a CD-ROM or a floppy disk (both generally depicted by block 1609), or alternatively could be read by the user from the network via a modem device connected to the computer, for example. Still further, the software can also be loaded into the computer system 1600 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums can be practiced without departing from the scope and spirit of the invention.

The embodiments can alternatively be implemented in dedicated hardware such as one or more integrated circuits performing the functions or sub functions of the video messaging system. Such dedicated hardware can include graphic processors, digital signal processors, or one or more microprocessors and associated memories.

The foregoing only describes a small number of embodiments of the present invention, however, modifications and/or changes can be made thereto by a person skilled in the art without departing from the scope and spirit of the invention.

What is claimed is:

1. A method of conveying a video message from an originator of the video message to one or more remotely positioned recipients, said method comprising the steps of:
   (i) creating a hierarchical video message structure including at least one node adapted to contain one or more links to one or more segments of video data for forming said video message;
   (ii) establishing a link between at least one of said nodes of said structure and at least one of said segments of video data to create a structured video message, said structured video message comprising at least one linked node referencing at least said one segment of video data, whereby said structured video message is associated with said structure so as to provide said originator with enhanced capabilities for manipulation of said video data, said video data being manipulated by manipulating said structure, said manipulation capabilities including at least altering a position of a node within said structure so as to alter a temporal position of an associated segment of video data within said video message; and
   (iii) conveying the structured video message to at least one of said remotely positioned recipients for viewing and/or for providing said at least one recipient with substantially the same enhanced manipulation capabilities.

2. A method according to claim 1, wherein establishing a link includes associating with each linked node a start time position and end time position of the video segment.

3. A method according to claim 1, wherein establishing a link includes associating a start time position and an end image data of the segment of video data with said node.

4. A method according to claim 1, further comprising the step of capturing said video data, wherein linking between said structure and said video data is performed during capture of the video data.

5. A method according to claim 1, wherein the enhanced manipulation capabilities includes one or more capabilities selected from a set consisting of:
   Video message planning;
   Video message capturing;
   Video message labeling;
   Video message navigating;
   Video message editing; and
   Video message annotating.

6. A method according to claim 1, wherein step (ii) includes the further sub-steps of:
   providing a message template; and
   executing said message template to generate said video message structure having a plurality of nodes, each said node being capable of representing a segment of video data of said video message.

7. A method according to claim 6, wherein said structured video message is an instantiation of the message template.

8. A method according to claim 7, wherein said instantiation of the message template provides a customized video message structure according to predetermined user preferences.

9. A method according to claim 8, wherein said customized message template can be saved as a new message template including the user preferences.

10. A method according to claim 8, wherein during execution said message template provides guidance to a user generating the video message structure.

11. A method according to claim 10, wherein the template prompts a user for user input information.

12. A method according to claim 6, wherein the message template further sets attributes for the video message.

13. A method according to claim 12, wherein the attributes include any one or more selected from a set consisting of:
   a tone of the video message,
   an intent of the video message; and
   duration of the video message or part thereof.

14. A method according to claim 6, wherein conveying said structured video message includes transmitting over a network said structured video message.

15. A method according to claim 14, wherein said structured video message includes said video data and said message template.

16. A method according to claim 15, wherein transmitting said message template includes transmitting a reference address location for obtaining the message template.

17. A method according to claim 15, wherein transmitting said video data and said message template includes transmitting a reference address location for obtaining the video data and message template, respectively.

18. A method according to claim 1, further including the step of editing said structured video message.

19. A method according to claim 18, wherein said editing includes the further sub-steps of:
   storing said video message in a memory;
   displaying said video message structure; and
   manipulating said nodes to place said video message in a desired format, wherein at least one node represents at least one segment of video data of said video message.

20. A method according to claim 18, wherein additional nodes representing further captured segments of video data are added to said video message.

21. A method according to claim 20, wherein any unwanted nodes are deleted from said structure so that only wanted information in retained.

22. A method according to claim 21, wherein a segment of said video message that is represented by a deleted node is retained in said memory.

23. A method according to claim 1, wherein said video message structure allows said originator to include at least one of a plurality of standard items in said video message.

24. A method according to claim 23, wherein said standard items include at least standard greetings, a business address and a company profile.

25. A method according to claim 1, wherein each node is labelled by a textual string.

26. A method according to claim 25, wherein said textual string relates to the content of said video segment.

27. A method according to claim 25, wherein said textual string capable of being edited.

28. A method according to claim 1, wherein said originator or a recipient of said video message can pause and restart said video message when viewing said video message.

29. A method according to claim 1, wherein said video message structure indicates a current position within said video message when viewed.

30. A method according to claim 29, wherein said current position is indicated by a karaoke-style ball displayed within said video message structure.

31. A method according to claim 29, wherein said current position is indicated by highlighting current text within said video message structure.

32. A method according to claim 29, wherein said current position is indicated by
   displaying corresponding text of any video sequence at the base of a display upon which said video message is being viewed.

33. An apparatus for conveying a video message from an originator of the video message to one or more remotely positioned recipients, said apparatus comprising:
   processing means for creating a hierarchical video message structure having at least one node adapted to contain one or more links to one or more segments of video data for forming said video message, said processing means being further configured for establishing a link between at least one of said nodes of said structure and at least one of said segments of said video data to create a structured video message, said structured video message comprising at least one linked node referencing at least said one segment of video data, whereby said structured video message is associated with said structure so as to provide said originator with enhanced capabilities for manipulation of said video data, said video data being manipulated by manipulating said structure, said manipulation capabilities including at least altering a position of a node within said structure so as to alter a temporal position of an associated segment of video data within said video message; and
   means for conveying the structured video message to at least one of said remotely positioned recipients for viewing and/or for providing said at least one recipient with substantially the same enhanced manipulation capabilities.

34. An apparatus according to claim 33, wherein establishing a link includes associating with each linked node a start time position and end time position of the video segment.

35. An apparatus according to claim 33, wherein establishing a link includes associating a start time position and an end image data of the segment of video data with said node.

36. An apparatus according to claim 33, further comprising capturing means for capturing said video data, wherein linking between said structure and said video data is performed during capture of the video data.

37. An apparatus according to claim 33, wherein the enhanced manipulation capabilities includes one or more capabilities selected from a set consisting of:
Video message planning;
Video message capturing;
Video message labeling;
Video message navigating;
Video message editing; and
Video message annotating.

38. An apparatus according to claim 33, said apparatus further comprising:
means for providing a message template; and
means for executing said message template to generate said video message structure having a plurality of nodes, each said node being capable of representing to a segment of video data of said video message.

39. An apparatus according to claim 38, wherein said structured video message is an instantiation of the message template.

40. An apparatus according to claim 39, wherein said instantiation of the message template provides a customized video message structure according to predetermined user preferences.

41. An apparatus according to claim 40, wherein said customized message template can be saved as a new message template including the user preferences.

42. An apparatus according to claim 40, wherein during execution said message template provides guidance to a user generating the video message structure.

43. An apparatus according to claim 42, wherein the template prompts a user for user input information.

44. An apparatus according to claim 38, wherein the message template further sets attributes for the video message.

45. An apparatus according to claim 48, wherein the attributes include any one or more selected from a set consisting of:
a tone of the video message,
an intent of the video message; and
duration of the video message or part thereof.

46. An apparatus according to claim 38, wherein conveying said structured video message includes transmitting over a network said structured video message.

47. An apparatus according to claim 46, wherein said structured video message includes said video data and said message template.

48. An apparatus according to claimed 47, wherein transmitting said message template includes transmitting a reference address location for obtaining the message template.

49. An apparatus according to claim 47, wherein transmitting said video data and said message template includes transmitting a reference address location for obtaining the video data and message template, respectively.

50. An apparatus according to claim 33, said apparatus further comprising editing means for editing said structured video message.

51. An apparatus according to claim 50, said editing means comprising:
storage means for storing said video message in a memory;
display for displaying said video message structure; and
a processor for manipulating said nodes to place said video message in a desired format, wherein at least one node represents at least one segment of video data of said video message.

52. An apparatus according to claim 50, wherein additional nodes representing further captured segments of video data are added to said video message.

53. An apparatus according to claim 52, wherein any unwanted nodes are deleted from said structure so that only wanted information in retained.

54. An apparatus according to claim 53, wherein a segment of said video message that is represented by a deleted node is retained in said memory.

55. An apparatus according to claim 33, wherein said video message structure allows said originator to include at least one of a plurality of standard items in said video message.

56. An apparatus according to claim 55, wherein said standard items include at least standard greetings, a business address and a company profile.

57. An apparatus according to claim 33, wherein each node is labelled by a textual string.

58. An apparatus according to claim 57, wherein said textual string relates to the content of said video segment.

59. An apparatus according to claim 57, wherein said textual string is capable of being edited.

60. An apparatus according to claim 33, wherein said originator or a recipient of said video message can pause and restart said video message when viewing said video message.

61. An apparatus according to claim 33, wherein said video message structure indicates a current position within said video message when viewed.

62. An apparatus according to claim 61, wherein said current position is indicated by a karaoke-style ball displayed within said video message structure.

63. An apparatus according to claim 61, wherein said current position is indicated by highlighting current text within said video message structure.

64. An apparatus according to claim 61, wherein said current position is indicated by displaying corresponding text of any video sequence at the base of a display upon which said video message is being viewed.

65. A computer readable memory medium for storing a program for apparatus which processes data, said processing comprising a method of conveying a video message from an originator of the video messages to one or more remotely positioned recipients, said program comprising:
code for creating a hierarchical video message structure including at least one node adapted to contain one or more links to one or more segments of video data for forming said video message;
code for establishing a link between at least one of said nodes of said structure and at least one of said segments of said video data to create a structured video message, said structured video message comprising at least one linked node referencing at least said one segment of video data, whereby said structured video message is associated with said structure so as to provide said originator with enhanced manipulation capabilities for manipulation of said video data, said video data being manipulated by manipulating said structure, said manipulation capabilities including at least altering a position of a node within said structure so as to alter a temporal position of an associated segment of video data within said video messages; and
code for conveying the structured video message to at least one of said remotely positioned recipients for viewing and/or for providing said at least one recipient with substantially the same enhanced manipulation capabilities.

66. The computer readable memory medium according to claim 65, wherein said code for establishing a link includes code for associating with each linked node a start time position and end time position of the video segment.

67. The computer readable memory medium according to claim 65, wherein said code for establishing a link includes code for associating a start time position and an end image data of the segment of video data with said node.

68. The computer readable memory medium according to claim 65, further comprising code for capturing said video data, wherein linking between said structure and said video data is performed during capture of the video data.

69. The computer readable memory medium according to claim 65, wherein the enhanced manipulation capabilities includes one or more capabilities selected from a set consisting of:
  Video message planning;
  Video message capturing;
  Video message labeling;
  Video message navigating;
  Video message editing; and
  Video message annotating.

70. The computer readable memory medium according to claim 65, wherein code for creating a video message structure further includes:
  code for providing a message template; and
  code for executing said message template to generate said video message structure having a plurality of nodes, each said node being capable of representing to a segment of video data of said video message.

71. The computer readable memory medium according to claim 70, wherein said structured video message is an instantiation of the message template.

72. The computer readable memory medium according to claim 71, wherein said instantiation of the message template provides a customized video message structure according to predetermined user preferences.

73. The computer readable memory medium according to claim 72, wherein said customized message template can be saved as a new message template including the user preferences.

74. The computer readable memory medium according to claim 72, wherein during execution said message template provides guidance to a user generating the video message structure.

75. The computer readable memory medium according to claim 74, wherein the template prompts a user for user input information.

76. The computer readable memory medium according to claim 70, wherein the message template further sets attributes for the video message.

77. The computer readable memory medium according to claim 76, wherein the attributes include any one or more selected from a set consisting of:
  a tone of the video message,
  an intent of the video message; and
  duration of the video message or part thereof.

78. The computer readable memory medium according to claim 70, wherein conveying said structured video message includes transmitting over a network said structured video message.

79. The computer readable memory medium according to claim 78, wherein said structured video message includes said video data and said message template.

80. The computer readable memory medium according to claim 79, wherein transmitting said message template includes transmitting a reference address location for obtaining the message template.

81. The computer readable memory medium according to claim 79, wherein code for transmitting said video data and said message template further includes code for transmitting a reference address location for obtaining the video data and message template, respectively.

82. The computer readable memory medium according to claim 65, further including code for editing said structured video message.

83. The computer readable memory medium according to claim 82, wherein said code for editing further includes:
  code for storing said video message in a memory;
  code for displaying said video message structure; and
  code for manipulating said nodes to place said video message in a desired format, wherein at least one node represents at least one segment of video data of said video message.

84. The computer readable memory medium according to claim 82, wherein additional nodes representing further captured segments video data are added to said video message.

85. The computer readable memory medium according to claim 84, wherein any unwanted nodes are deleted from said structure so that only wanted information in retained.

86. The computer readable memory medium according to claim 85, wherein a segment of said video message that is represented by a deleted node is retained in said memory.

87. The computer readable memory medium according to claim 65, wherein said video message structure allows said originator to include at least one of a plurality of standard items in said video message.

88. The computer readable memory medium according to claim 87, wherein said standard items include at least standard greetings, a business address and a company profile.

89. The computer readable memory medium according to claim 65, wherein each node is labelled by a textual string.

90. The computer readable memory medium according to claim 89, wherein said textual string relates to the content of said video segment.

91. The computer readable memory medium according to claim 89, wherein said textual string is capable of being edited.

92. The computer readable memory medium according to claim 65, wherein said originator or a recipient of said video message can pause and restart said video message when viewing said video message.

93. The computer readable memory medium according to claim 65, wherein said video message structure indicates a current position within said video message when viewed.

94. The computer readable memory medium according to claim 93, wherein said current position is indicated by a karaoke-style ball displayed within said video message structure.

95. The computer readable memory medium according to claim 93, wherein said current position is indicated by highlighting current text within said video message structure.

96. The computer readable memory medium according to claim 93, wherein said current position is indicated by displaying corresponding text of any video sequence at the base of a display upon which said video message is being viewed.

97. A method of conveying a video message from an originator of the video message to one or more remotely positioned recipients, said method comprising the steps of:

providing a hierarchical tree video message structure including at least one node adapted to contain one or more links to one or more segments of video data for forming said video message;

establishing a link between at least one of said nodes of said structure and at least one of said segments of said video data to provide a structured video message, said structured video message comprising at least one linked node referencing at least said one segment of video data, whereby said structured video message is associated with said structure so as to provide said originator with enhanced capabilities for manipulation of said video data, said video data being manipulated by manipulating said structure; and conveying the structured video message to at least one of said remotely positioned recipients for viewing and/or for providing said at least one recipient with substantially the same enhanced manipulation capabilities.

98. A method according to claim 97, wherein at least one node is labelled with a semantic label describing the topic of an associated video segment.

99. A method according to claim 97, wherein the enhanced manipulation capabilities includes one or more capabilities selected from a set consisting of:

Video message labeling;

Video message navigating;

Video message editing; and

Video message annotating.

100. A method according to claim 97, wherein conveying said structured video message includes conveying the video data and separately the associated video message structure.

101. A method according to claim 97, wherein conveying said structured video message includes conveying the video data and a reference address for locating the associated video message structure.

102. A method according to claim 97, wherein conveying includes transmitting over a network said structured video message.

103. A method of conveying a video message over a network, wherein said video message includes one or more segments of video image data and an associated audio message, said method including the steps of:

capturing said one or more segments of video data for forming said video message on a first apparatus;

processing said captured video message to provide a structured video message, wherein said structured video message is represented as a hierarchical tree structure including at least one node adapted to contain one or more links to one or more of said segments of video data for forming said video message, said structured video message comprising at least one linked node referencing at least one of said segments of said video data, said hierarchical tree structure allowing an originator labelling, navigation, editing and annotation capabilities; and transmitting over said network the structured video message to at least one second apparatus;

receiving said structured video message at the at least one second apparatus;

processing and viewing said received structured video message by a recipient in accordance with said hierarchical tree structure.

104. A method according to claim 103, wherein said structure further allows the recipient labelling, navigation, editing and annotation capabilities.

105. A method according to claim 103, wherein said structure includes a plurality of nodes arranged in a hierarchical manner.

106. A method according to claim 103, wherein at least one node is labelled with a semantic label relating to the segment of the video message.

107. A method according to claim 103, wherein said structure allows the originator to include at least one of a plurality of standard items in said structured video message.

108. A method according to claims 107, wherein said standard items are selected from a set consisting of:

standard greetings;

a business address;

a company profile;

a uniform resource locator (URL);

date, time;

originator signature.

109. A method according to claim 103, wherein said structured video message is an instantiation of a video message template.

110. A system for conveying a video message, wherein said video message includes one or more segments of video image data and an associated audio message, said system including:

at least one first apparatus including:

capturing means for capturing said one or more segments of video data for forming said video message;

processing means for processing the captured video message to provide a structured video message, wherein said structured video message is represented as a hierarchical tree structure including at least one node adapted to contain one or more links to one or more of said segments of video data for forming said video message, said structured video message comprising at least one linked node referencing at least one of said segments of video data, said hierarchical tree structure allowing an originator of said video message labelling, navigation, editing and annotation capabilities; and means for transmitting the structured video message to at least one second apparatus;

said second apparatus including:

means for receiving said structured video message;

means for processing and viewing by a recipient said received structured video message in accordance with said hierarchical tree structure.

111. A system according to claim 110, wherein said structure further allows the recipient labelling, navigation, editing and annotation capabilities.

112. A system according to claim 110, wherein said structure includes a plurality of nodes arranged in a hierarchical manner.

113. A system according to claim 110, wherein at least one node is labelled with a semantic label relating to the segment of the video message.

114. A system according to claim 110, wherein said structure allows the originator to include at least one of a plurality of standard items in said structured video message.

115. A system according to claims 114, wherein said standard items are selected from a set consisting of:

standard greetings;

a business address;

a company profile;

a uniform resource locator (URL);

date, time;

originator signature.

116. A system according to claim 110, wherein said structured video message is an instantiation of a video message template.

117. A computer readable medium for storing a program for apparatus which processes data, said processing comprising a method of conveying a video message over a network, wherein said video message includes one or more segments of video image data and an associated audio message, said program comprising:

code for capturing said one or more segments of video data for forming said video message on a first apparatus;

code for processing said captured video message to provide a structured video message, wherein said structured video message is represented as a hierarchical tree structure including at least one node adapted to contain one or more links to one or more of said segments of video data for forming said video message, said structured video message comprising at least one linked node referencing at least one of said segments of video data, said hierarchical tree structure allowing an originator labelling, navigation, editing and annotation capabilities;

code for transmitting the structured video message to at least one second apparatus;

code for receiving said structured video message at the at least one second apparatus; and code for processing and viewing, by a recipient, said received structured video message in accordance with said hierarchical tree structure.

118. A computer readable medium according to claim 117, wherein said structure further allows the recipient labelling, navigation, editing and annotation capabilities.

119. A computer readable medium according to claim 117, wherein said structured video message is an instantiation of a video message template.

120. A method of conveying a video message including the steps of:

capturing video data on a first apparatus, wherein said video data includes one or more segments of image data and associated audio data;

processing said captured video data to provide a video message, wherein said video message includes said captured video data and a first video message hierarchical tree structure being a first instantiation of a message template, said first video message hierarchical tree structure including at least one node adapted to contain one or more links to one or more of said segments of video data for forming said video message;

transmitting said one or more segments of video data and said message template to at least one second apparatus;

receiving the video data and the message template at the second apparatus;

processing said video data to provide a corresponding video message, wherein said corresponding video message includes said video data and a second video message hierarchical tree structure being a second instantiation of said message template; and viewing said corresponding video message in accordance with said second video message hierarchical tree structure.

121. A method according to claim 120, wherein transmitting said message template includes transmitting a reference address location for obtaining the message template.

122. A method according to claim 120, wherein transmitting said video data and said message template includes transmitting a reference address location for obtaining the video data and message template, respectively.

123. A method according to claim 120, wherein the first video message structure and the second video message structure are substantially identical.

124. A method according to claim 120, wherein instantiation of the message template provides a customized video message structure according to predetermined user preferences.

125. A method according to claim 124, wherein said customized video message structure can be saved as a new video message structure including the user preferences.

126. A method according to claim 120, wherein the message template prompts a user to provide the user preferences.

127. A method according to claim 120, wherein transmitting includes downloading data to be transmitted onto a removable storage medium and conveying said removable medium to an intended recipient.

128. A system for conveying a video message including:

at least one first apparatus including:

capturing means for capturing video, wherein said video data includes one or more segments of video image data and associated audio data;

processing means for processing said captured video data to provide a video message, wherein said video message includes said captured video data and a first video message hierarchical tree structure, said first structure being a first instantiation of a message template, said first structure including at least one node adapted to contain one or more links to one or more of said segments of video data for forming said video message;

means for transmitting the structured video message to at least one second apparatus;

said second apparatus including:

means for receiving the video data and the message template at the second apparatus;

means for processing said video data to provide a corresponding video message, wherein said corresponding video message includes said video data and a second video message hierarchical tree structure being a second instantiation of said message template; and means for viewing said corresponding video message in accordance with said second video message hierarchical tree structure.

129. A system according to claim 128, wherein transmitting said message template includes transmitting a reference address location for obtaining the message template.

130. A system according to claim 128, wherein transmitting said video data and said message template includes transmitting a reference address location for obtaining the video data and message template respectively.

131. A system according to claim 128, wherein the first video message structure and the second video message structure are substantially identical.

132. A system according to claim 128, wherein instantiation of the message template provides a customised video message structure according to predetermined user preferences.

133. A system according to claim 132, wherein said customised video message structure can be saved as a new message structure including the user preferences.

134. A computer readable medium for storing a program for apparatus which processes data, said processing comprising a method of conveying a video message, said video message including video data comprising one or more segments of video image data and associated audio data, said program comprising:

code for capturing said one or more segments of video data on a first apparatus, code for processing said captured video data to provide a video message, wherein said video message includes said captured video data and a first video message hierarchical tree structure being a first instantiation of a message template, said first hierarchical tree structure including at least one node adapted to contain one or more links to one or more of said segments of video data for forming said video message;

code for transmitting said video data and said message template to at least one second apparatus;

code for receiving the video data and the message template at the second apparatus;

code for processing said video data to provide a corresponding video message, wherein said corresponding video message includes said video data and a second video message hierarchical tree structure being a second instantiation of said message template; and code for viewing said corresponding video message in accordance with said second video message hierarchical tree structure.

135. A computer readable medium according to claim 134, wherein transmitting said message template includes transmitting a reference address location for obtaining the message template.

136. A computer readable medium according to claim 134, wherein transmitting said video data and said message template includes transmitting a reference address location for obtaining the video data and message template, respectively.

* * * * *

UNITED STATES PATENT AND TRADEMARK OFFICE
CERTIFICATE OF CORRECTION

PATENT NO. : 6,748,421 B1
DATED : June 3, 2004
INVENTOR(S) : Nadine Ozkan et al.

It is certified that error appears in the above-identified patent and that said Letters Patent is hereby corrected as shown below:

<u>Title page,</u>
Item [75], Inventors:
"Nadine Ozkan, New South Wales (AU): Cecile Paris, New South Wales (AU); Maria Milosavljevic, New South Wales (AU); Sue-Ken Yap, New South Wales (AU); William Simpson-Young, New South Wales (AU); Charles Chung, New South Wales (AU); John Charles Brook, Stanhope Garden (AU)"

should read

-- Nadine Ozkan, Cremorne (AU); Cecile Paris, Drummoyne (AU); Maria Milosavljevic, North Ryde (AU); Sue-Ken Yap Lane Cove (AU); William Simpson-Young, Eastwood (AU); Charles Chung, Eastwood (AU); John Charles Brook, Stanhope Garden (AU) --

<u>Column 1,</u>
Line 20, "etc)." should read -- etc.). --.
Line 32, "Inc" should read -- Inc. --.

<u>Column 3,</u>
Line 56, "provided" should read -- provide --.

<u>Column 4,</u>
Line 56, "capabilities; and" should read -- capabilities; --.
Line 61, "apparatus;" should read -- apparatus; and --.

<u>Column 9,</u>
Line 54, "etc" should read -- etc. --.

<u>Column 11,</u>
Line 42, "(e.g." should read -- (e.g., -- and "etc)." should read -- etc.). --.
Line 43, "(i.e." should read -- (i.e., --.

<u>Column 13,</u>
Line 53, "(i.e." should read -- (i.e., --.

<u>Column 14,</u>
Line 1, "(ie:" should read -- (i.e.: --.
Line 23, "emphasise" should read -- emphasize --.
Line 35, "(ie." should read -- (i.e., --.
Line 44, "139" should read -- 139. --.

UNITED STATES PATENT AND TRADEMARK OFFICE
CERTIFICATE OF CORRECTION

PATENT NO.   : 6,748,421 B1
DATED        : June 3, 2004
INVENTOR(S)  : Nadine Ozkan et al.

It is certified that error appears in the above-identified patent and that said Letters Patent is hereby corrected as shown below:

Column 14 cont.,
Line 55, "(e.g." should read -- (e.g., --.
Line 64, "organisation" should read -- organization --.
Line 65, "centre" should read -- center --.

Column 16,
Lien 58, "specialised" should read -- specialized --.

Column 17,
Line 27, "(e.g." should read -- (e.g., --.
Line 41, "utilise" should read -- utilize --.

Column 18,
Line 25, "(e.g." should read -- (e.g., --.
Line 27, "etc)." should read --etc.). --.
Line 36, "summarising;" should read -- summarizing; --.

Column 23,
Line 39, "practise," should read -- practice, --.

Column 25,
Line 17, "colour" should read -- color --.
Line 18, "GUI." should read -- GUI --.

UNITED STATES PATENT AND TRADEMARK OFFICE
CERTIFICATE OF CORRECTION

PATENT NO.    : 6,748,421 B1
DATED         : June 8, 2004
INVENTOR(S)   : Nadine Ozkan et al.

It is certified that error appears in the above-identified patent and that said Letters Patent is hereby corrected as shown below:

Column 26,
Line 13, "template" should read -- template is --.
Line 15, "a" (1st occurrence) should be deleted.

Column 28,
Line 55, "(i.e." should read -- (i.e., --.

Column 31,
Line 50, "etc" should read -- etc. --.

Column 34,
Line 48, "etc" should read -- etc. --.

Column 37,
Line 67, "in" should read -- is --.

Column 38,
Line 14, "string" should read -- string is --.
Line 28, (close up right margin).

Column 39,
Line 40, "48," should read -- 44 --.

Column 40,
Line 9, "in" should read -- is --.

Column 42,
Line 26, "in" should read -- is --.

Column 43,
Line 56, "capabilities; and" should read -- capabilities; --.

UNITED STATES PATENT AND TRADEMARK OFFICE
CERTIFICATE OF CORRECTION

PATENT NO. : 6,748,421 B1
DATED : June 8, 2004
INVENTOR(S) : Nadine Ozkan et al.

It is certified that error appears in the above-identified patent and that said Letters Patent is hereby corrected as shown below:

Column 44,
Lines 10 and 60, "claims" should read -- claim --.
Line 16, "time;" should read -- time; and --.
Line 43, "message;" should read -- message; and --.
Line 67, "time;" should read -- time; and --.

Column 46,
Line 33, "message" should read -- message; and --.
Line 60, "customised" should read -- customized --.
Line 64, "customised" should read -- customized --.

Column 47,
Line 6, "apparatus," should read -- apparatus; --.

Signed and Sealed this

Fifth Day of October, 2004

JON W. DUDAS
*Director of the United States Patent and Trademark Office*